US012728659B1

(12) United States Patent
Irving et al.

(10) Patent No.: US 12,728,659 B1
(45) Date of Patent: Sep. 8, 2026

(54) AQUEOUS INK RECEPTIVE PRIMER COMPOSITIONS AND RECEIVING MEDIA

(71) Applicant: Eastman Kodak Company, Rochester, NY (US)

(72) Inventors: Mark Edward Irving, Rochester, NY (US); Lyn M. Irving, Rochester, NY (US); Trevor D. Leinenbach, Rochester, NY (US); David D. Putnam, Fairport, NY (US); Douglas Eugene Bugner, Rochester, NY (US)

(73) Assignee: EASTMAN KODAK COMPANY, Rochester, NY (US)

(*) Notice: Subject to any disclaimer, the term of this patent is extended or adjusted under 35 U.S.C. 154(b) by 0 days.

(21) Appl. No.: 19/192,416

(22) Filed: Apr. 29, 2025

(51) Int. Cl.
*B41M 5/52* (2006.01)
*B41M 5/00* (2006.01)
*B41M 5/50* (2006.01)

(52) U.S. Cl.
CPC ........ *B41M 5/5227* (2013.01); *B41M 5/0011* (2013.01); *B41M 5/50* (2013.01); *B41M 5/52* (2013.01); *B41M 5/5218* (2013.01); *B41M 5/5236* (2013.01); *B41M 5/5272* (2013.01)

(58) Field of Classification Search
CPC .... B41M 5/5227; B41M 5/0011; B41M 5/50; B41M 5/52; B41M 5/5218; B41M 5/5236; B41M 5/5272
USPC ........................................................ 428/32.34
See application file for complete search history.

(56) References Cited

U.S. PATENT DOCUMENTS

| | | | |
|---|---|---|---|
| 4,554,181 A | 11/1985 | Cousin et al. | |
| 4,677,160 A * | 6/1987 | Kondo ....................... | C08J 3/03 524/588 |
| 7,199,182 B2 | 4/2007 | Tanaka et al. | |
| 8,034,422 B2 | 10/2011 | Dannhauser et al. | |
| 8,034,432 B2 | 10/2011 | Dannhauser et al. | |
| 8,173,215 B2 | 5/2012 | Sowinski et al. | |
| 8,236,393 B2 | 8/2012 | Zeng et al. | |
| 8,562,126 B1 | 10/2013 | Xiang et al. | |
| 9,067,448 B2 | 6/2015 | Dannhauser et al. | |

(Continued)

OTHER PUBLICATIONS

HU 226974 B1 Machine Translation (Year: 2010).*

(Continued)

*Primary Examiner* — Betelhem Shewareged
(74) *Attorney, Agent, or Firm* — J. Lanny Tucker

(57) ABSTRACT

An aqueous ink receptive primer composition is useful for pre-treating a water-absorptive substrate to prepare or prime the resulting inkjet receiving media for high quality and potentially high-speed inkjet printing. This aqueous ink receptive primer composition has 8-25% solids, and includes (a) one or more water-soluble salts of a multivalent metal cation, in a total amount of 0.1-30 weight %; (b) one or more water-soluble or water-dispersible polymeric binder materials in a total amount of 1-20 weight %, each having a $M_w$ of 50,000 to 180,000; and (c) fluorine-free wax particles composed of a water-insoluble composite that comprises one or more polymers comprising a polyalkylene, a polyester, or a polyimide, in an amount of 0.1-2 weight %. The noted composition on the water-absorptive substrate allows high-speed inkjet printing with reduced ink misting while maintaining high inkjet-printed image quality.

25 Claims, 1 Drawing Sheet

(56) References Cited

U.S. PATENT DOCUMENTS

| | | | |
|---|---|---|---|
| 9,376,582 | B1 | 6/2016 | Dannhauser et al. |
| 9,421,808 | B2 | 8/2016 | Ferrar et al. |
| 9,427,975 | B2 | 8/2016 | Bugner et al. |
| 9,434,201 | B2 | 9/2016 | Dannhauser et al. |
| 9,573,349 | B1 | 2/2017 | Dannhauser et al. |
| 9,789,677 | B2 | 10/2017 | Tsutsui et al. |
| 9,994,723 | B2 | 6/2018 | Bauer et al. |
| 10,022,944 | B2 | 7/2018 | Schuman et al. |
| 10,646,412 | B1 | 5/2020 | Czarnecki |
| 10,730,331 | B2 | 8/2020 | Dannhauser et al. |
| 10,858,529 | B2 | 12/2020 | Irving et al. |
| 10,858,530 | B2 | 12/2020 | Dannhauser et al. |
| 10,894,437 | B1 | 1/2021 | Putnam et al. |
| 10,919,328 | B2 | 2/2021 | Irving et al. |
| 10,926,565 | B1 | 2/2021 | Irving et al. |
| 11,155,076 | B2 | 10/2021 | Lussier et al. |
| 11,267,940 | B2 | 3/2022 | Inaba et al. |
| 11,401,434 | B2 | 8/2022 | Putnam et al. |
| 11,478,819 | B2 | 10/2022 | Samad |
| 11,970,624 | B2 | 4/2024 | Li et al. |
| 11,970,626 | B2 | 4/2024 | Li et al. |
| 12,024,637 | B2 | 7/2024 | Sato et al. |
| 2002/0012775 | A1* | 1/2002 | Steiger ................. B41M 5/5218 428/32.37 |
| 2011/0279554 | A1 | 11/2011 | Dannhauser |
| 2012/0034398 | A1* | 2/2012 | Wang ..................... B41M 5/529 428/32.21 |
| 2014/0292902 | A1 | 10/2014 | Kagata et al. |
| 2022/0119666 | A1 | 4/2022 | Irving et al. |
| 2022/0379646 | A1 | 12/2022 | Irving et al. |
| 2023/0023036 | A1 | 1/2023 | Li et al. |
| 2024/0240043 | A1 | 7/2024 | Tehrani et al. |

OTHER PUBLICATIONS

Sekisui Specialty Chemicals, "Selvol™ Polyvinyl Alcohol Product Information," Apr. 6, 2023 (website https://www.sekisui-sc.com/products/polyvinyl-alcohol).

Michael S. Owens et al., "Misting of Newtonian Liquids in Forward Roll Coating," *Industrial & engineering Chemistry Research*, 2011, vol. 50, Issue 6, pp. 3212-3219.

Sekisui Specialty Chemicals, "Selvoi Polyvinyl Alcohol Product Informati on," Apr. 6, 2023 (website https:/www.sekisui-sc.com/products/polyvinyl-alcohol).

* cited by examiner

AQUEOUS INK RECEPTIVE PRIMER COMPOSITIONS AND RECEIVING MEDIA

CROSS-REFERENCE TO RELATED APPLICATION

Reference is made to copending and commonly assigned U.S. Ser. No. 19/192,427, filed on Apr. 29, 2025, by M. Irving, L. Irving, T. Leinenbach, D. Putnam, and D. Bugner, and entitled "Inkjet Printing on Inkjet Receiving Media" the disclosure of which is incorporated herein by reference.

FIELD OF THE INVENTION

This invention relates to the field of inkjet printing. More particularly, it relates to inventive aqueous ink receptive primer compositions for pre-treating water-absorptive substrates prior to inkjet printing thereon. It also relates to inventive inkjet receiving media prepared from the aqueous ink receptive primer compositions on water-absorptive substrates, and to an inventive method for making these inkjet receiving media.

BACKGROUND OF THE INVENTION

It is known to deposit aqueous pigment-based inks, particularly those having anionically stabilized or dispersed pigment colorants onto a substrate that has been treated with an aqueous inkjet receptive primer (or simply "primer") composition containing cations of a multivalent metal salt, one or more polymeric binders, and various other addenda such as wax particles. The presence of the multivalent metal cations can be used to prevent deposited ink drops from penetrating too far below the surface of a water-absorptive substrate, thereby preventing a lowering of optical density. The multivalent metal cations can also be used to prevent bleeding or coalescing of adjacent deposited ink drops of the same or different colors on a less absorbent substrate such as a hydrophobic substrate, thereby preventing the formation of blurry or grainy appearing images. Surface treatments comprising aqueous salts of multivalent metal ions are particularly advantageous for high-speed printing with page-wide inkjet arrays whereby adjacent drops of ink are deposited within just a few microseconds of each other onto the substrate.

U.S. Pat. No. 9,067,448B2 (Dannhauser et al.), 9,434,201B2 (Dannhauser et al.), 10,858,529B2 (Irving et al.), 10,926,565B1 (Irving et al.), and 11,155,076B2 (Lussier et al.) generally describe inkjet receiving media suitable for high speed inkjet printing, which media include a substrate having an inkjet printable topmost layer applied thereto which comprises such aqueous soluble salts of a multivalent metal cation, a cross-linked hydrophilic polymer binder or other polymeric binder, and various addenda including surfactants and composite wax particles composed of one or more polymers including fluorinated polymers.

U.S. Pat. No. 8,562,126B1 (Xiang et al.) describes inkjet receiving media comprising a substrate that also comprises an inkjet printable topmost layer coated thereon.

In recent years, Eastman Kodak Company has developed important innovations in high-speed inkjet printing systems and equipment that allow various surfaces to be inkjet-printed with one or more colored aqueous pigment-based inks at very high speeds. In general, such high-speed printing processes use one or more aqueous pigment-based inks that are ejected through one or more printheads (containing nozzles) and unprinted aqueous pigment-based ink is collected and recycled through the printing system multiple times until it is used up. Details of early high-speed inkjet printing processes and equipment are provided for example in U.S. Pat. No. 8,173,215B1 (Sowinski et al.).

An important advance in the art for high-speed printing apparatus and processes is described in commonly assigned U.S. Patent Application Publication 2022/0379646A1 (Irving et al.) in which an inventive aqueous topcoat (or "primer") composition was developed to provide an opaque background on inkjet-printed polymeric films. In addition, such aqueous topcoat compositions have been designed with specific wax particles to provide micro-sized protrusions in the dried coating.

There has been a need to improve coating and image quality during high-speed coating of an aqueous topcoat composition. Misting is a well-known phenomenon that occurs in forward roll-coating that can create coating non-uniformities and defects under certain conditions. Specifically, when a thin liquid film is created and carried between two moving cylinders in a forward roll-coating process, the film is prone to break up and create airborne particles ("mist" or as "misting"), particularly at higher coating speeds. Details regarding this phenomenon and how to address mist during coating are provided by Owens, Vinjamur, Scriven, and Macosko, "Misting of Newtonian Fluids in Forward Roll Coating," *Ind. Eng. Chem. Res.,* 2011, 50, 3212-3219. In forward roll coating equipment, the mist can potentially drop onto the substrate surface, creating coating globs and smears of partially dried aqueous topcoat material onto the coating surface. These eventually appear as image defects in the final coated and inkjet-printed article. Operators have found that one way to avoid this problem is to slow down the coating processes, but this reduces manufacturing efficiency. Reducing the polymer and particle content in the aqueous topcoat composition can also be considered but this action makes it difficult to apply a uniform coating and lowers the viscosity of the fluid which can penetrate the water absorptive substrate more easily, leading to increases in coalescence of inkjet-printed inks that are eventually printed on the aqueous topcoat composition surface.

Wax particles have been employed in known aqueous topcoat compositions to improve the durability of inkjet prints. However, various useful polymer composite wax particles described in the art for use in commercial products contain fluorinated materials such as fluorinated polymers. There is a desire to remove such fluorinated materials from aqueous topcoat compositions and the resulting inkjet-printed articles so that there are less fluorinated chemicals in the printing rooms and in the environment overall. The presence of these micrometer-sized fluorinated wax particles in any aqueous topcoat composition can also lead to more misting in forward roll-coating processes because the particles destabilize the fluid film at the coating nip.

In the process of reformulating an aqueous topcoat (or primer) composition for improvements in mist control and selecting a non-fluorinated wax particle that is compatible with the other fluid components, yet another problem emerged. It was found that the tested fluorine-free wax particles quickly float to the surface of the aqueous topcoat composition. This raised a concern that coating defects could potentially occur in forward roll-coating processes arising from build-up of residue that dries on coating rollers during periods of idle time. The need for frequent mixing to prevent phase separation of the aqueous topcoat composition components also creates an inconvenience for press operators to continuously mix drums of the coating fluid to ensure the composition can be always dispensed in the proper ratios.

Thus, there is an urgent need to prevent all these sources of coating defects created from high levels of mist that can occur with high coating speeds in formulations containing micrometer-sized composite fluorine-free waxes, as well as coating defects arising from phase separation of micrometer-sized composite wax particles accumulating on coating rollers during high-speed coating operations.

SUMMARY OF THE INVENTION

The present invention provides an aqueous ink receptive primer composition for pre-treating a water-absorptive substrate prior to inkjet printing thereon, the aqueous ink receptive primer composition having at least 8% solids and up to and including 25% solids, and comprising at least the following components (a), (b), and (c):

(a) one or more water-soluble salts of a multivalent metal cation, which (a) one or more water-soluble salts are present in a total amount of at least 0.1 weight % and up to and including 30 weight %;

(b) one or more water-soluble or water-dispersible polymeric binder materials that are present in a total amount of at least 1 weight % and up to and including 20 weight %, each of which (b) one or more water-soluble or water-dispersible polymeric binder materials has a weight average molecular weight ($M_w$) of at least 50,000 and up to and including 180,000;

(c) fluorine-free wax particles composed of a water-insoluble composite comprising one or more polymers comprising a polyalkylene, a polyester, or a polyimide, and present in an amount of at least 0.1 weight % and up to and including 2 weight %, wherein the amounts of the components (a), (b), and (c) are based on the total weight of the aqueous ink receptive primer composition.

This invention further provides an inkjet receiving medium comprising a water-absorptive substrate and any embodiment of the inventive aqueous ink receptive primer composition disposed on a surface thereof, which disposed aqueous ink receptive primer composition comprises the following components (a), (b), and (c):

(a) one or more water-soluble salts of a multivalent metal cation, which component (a) one or more water-soluble salts are present in a total amount of at least 20 weight % and up to and including 80 weight %;

(b) one or more water-soluble or water-dispersible polymeric binder materials that are present in a total amount of at least 10 weight % and up to and including 40 weight %, each of which component (b) one or more water-soluble or water-dispersible polymeric binder materials has a weight average molecular weight ($M_w$) of at least 50,000 and up to and including 180,000; and (c) fluorine-free wax particles composed of a water-insoluble composite comprising one or more polymers comprising a polyalkylene, a polyester, or a polyimide and present in an amount of at least 2.5 weight % and up to and including 12 weight %, and wherein the amounts of the components (a), (b), and (c) are based on the total weight of the disposed aqueous ink receptive primer composition.

In addition, the present invention provides a method for providing an inkjet receiving medium comprising, in order, steps A and B as follows:

A) providing a water-absorptive substrate; and

B) disposing any embodiment of the aqueous ink receptive primer composition of the present invention onto at least one surface of the water-absorptive substrate, to provide an inkjet receiving medium having a disposed aqueous ink receptive primer composition on the at least one water-absorptive substrate surface.

To address the multiple problems described above, the present invention provides an inventive aqueous topcoat composition that can be readily applied to a substrate surface at high coating speeds with significant reduction of the formation of a contaminating mist while also reducing coalescence of inkjet-printed inks on the resulting topcoat surface. Such high-speed coating also can be carried out in combination with high-speed inkjet printing on the same or different machines.

Hereinafter, the term "aqueous topcoat composition" will be referred to as "aqueous inkjet receptive primer composition." As is evident in the following teaching, the aqueous inkjet receptive primer compositions are disposed or applied as a continuous layer or pattern on top of a water-absorptive substrate prior to inkjet printing with aqueous pigment-based inkjet inks. As such, these compositions have sometimes been referred to as "topcoat compositions," but hereinafter, they are described as noted above, or simply as "primer compositions" given that their function is to prime the surface of the water-absorptive substrate surface to be inkjet-printed, thereby making that surface ready for subsequent inkjet printing. This feature of the present invention results in both excellent print quality as well as improved adhesion of both the primer and inkjet ink to the water-absorptive substrate.

To solve the multiple problems identified above, considerable research efforts were carried out to adjust various components of aqueous ink receptive primer compositions such as the amount of salts of multivalent metal cations, amounts and types of water-soluble or water-dispersible polymeric binders, and the content and amount of various addenda such as particulate fluorine-free waxes. The aim was to solve the mist problem and to minimize other coating problems while maintaining the other desired properties that contribute to good inkjet printing on water-absorptive substrates. It was discovered that the presence of water-soluble or water-dispersible polymeric binders generally having lower weight average molecular weight can reduce the mist problem and resulting defects occurring during inkjet printing. In addition, the use of various formulation-compatible fluorine-free waxes were incorporated in the aqueous ink receptive primer compositions in order to replace the fluorinated wax particles commonly used in industry.

With the solutions to these problems, high-speed coating of the aqueous ink receptive primer compositions onto suitable water-absorptive substrates, especially paper-based substrates having a paper-like inkjet printable surface can be more readily achieved, followed by high-speed inkjet printing using one or more aqueous pigment-based inkjet inks, especially those containing anionically-stabilized or dispersed pigments.

These advantages were achieved by using a unique blend of compatible components in the inventive aqueous ink receptive primer composition including component (b) one or more water-soluble or water-dispersible polymeric binder materials having a weight average molecular weight of at least 50,000 and up to and including 180,000, compared to previously used higher molecular weight polymeric binder materials. Another advantage was achieved by using component (c) fluorine-free wax particles that are comprised of nano-composite particles of a polymer such as a composite of one or more polymers comprising a polyalkylene, polyester, or polyimide and optionally with aluminum oxide, and which nano-composite particles were found to be compatible with all other formulation components. These changes were found to be advantageous along with carefully defined choices of composition viscosity, static surface tension, and other aqueous ink receptive primer composition parameters.

It was also surprising to find that the addition of silica particles to the aqueous ink receptive primer composition could reduce the flotation rate of the non-fluorinated wax particles in such compositions.

DETAILED DESCRIPTION OF THE INVENTION

Figure 1:
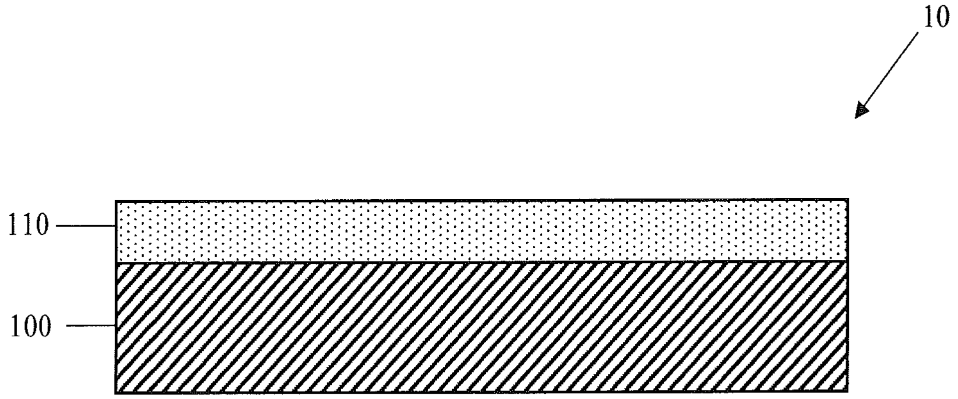
FIG. 1 shows a partial cross-sectional view of one embodiment of an inkjet receiving medium according to the present invention having an inventive aqueous ink receptive primer composition disposed on a water-absorptive substrate.

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure can have broader application than is explicitly described in the discussion of any specific embodiment.

As used herein to define various components of the aqueous ink receptive primer compositions for pre-treating, aqueous pigment-based inks, and other materials used in the practice of this invention, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted to have a standard dictionary meaning.

The use of numerical values in the various ranges specified herein, unless otherwise expressly indicated otherwise, are to be considered as approximations as though the minimum and maximum values within the stated ranges were both preceded by the word "about." In this manner, slight variations above and below the stated ranges may be useful to achieve substantially the same results as the values within the ranges. In addition, unless otherwise indicated, the disclosure of these ranges is intended as a continuous range including every value between the minimum and maximum values as well as the end points of the ranges.

As used herein, the parameter "acid number" (also known as acid value) is defined as the milligrams (mg) of potassium hydroxide required to neutralize 1 g of the described acidic polymer.

The term "aqueous" as used in inventive aqueous ink receptive primer compositions, aqueous organic pigment dispersions, and aqueous pigment-based inks according to the present invention means that the water content is at least 60 weight %, or at least 80 weight %, based on the total weight of all solvents in the composition. Thus, water is the predominant solvent in such compositions.

The term "water-soluble" refers to a solubility of a material in water of at least 0.5 g in 100 ml of water at 20° C.

Rockwell Hardness values for many polymeric materials can be learned from literature published on-line by Plastics International (http://www.plasticsintl.com) and on the Matweb Material Property Database (https://www.matweb.com). The values can be measured according to ASTM D785-51. PTFE has a Rockwell Hardness number of R58 and various grades of low-density and high-density polyethylene (LDPE/HDPE) have Rockwell Hardness numbers in the range R30-R70. Low-density polyethylene (LDPE) is softer than HDPE and is typically measured using a Shore Durometer D hardness scale useful for softer materials, also reported in these databases.

Median particle size ($D_{50}$) as equivalent spherical diameter (ESD) particle size, in micrometers (μm), can be determined using a Horiba Particle Size Distribution Analyzer (Horiba Scientific) using procedures desired for use with this instrument, which analyzer provides a volume-weighted particle size distribution. The term $D_{95}$ or the $95^{th}$ percentile particle size refers to the classified particle size distribution such that 95% of the particles have diameters smaller than the indicated diameter. Similarly, the term $D_{50}$ or the $50^{th}$ percentile particle size (or median particle size) refers to the classified particle size distribution such that 50% of the particles have diameters smaller than the indicated diameter. Such particle size measurements can be made using either laser diffraction (static) techniques or dynamic light-scattering techniques. However, for the purposes of the present invention including the working examples below, the $D_{50}$ and any $D_{95}$ particle size values were obtained using a commercially available Horiba particle size analyzer (Model LA-920) that provides a particle size value from a volume weighted particle size distribution.

Other particle size measuring techniques and equipment are known in the art also. For example, laser diffraction techniques will also provide a volume weighted particle size distribution. Dynamic light-scattering techniques will provide an intensity-weighted particle size distribution. One such device for this purpose is a Nanotrac 150 NPA ultrafine particle analyzer (Microtrac, Inc.). Standard procedures for using such a device are described in National Institute of Standards and Technology (NIST) Special Publication 1200-6, *Measuring the Size of Nanoparticles in Aqueous Media Using Batch-Mode Dynamic Light-Scattering NIST-NCL Joint Assay Protocol*, PCC-1 Version 1.2, May 2015 and in ISO 22412:2017 Particle Size Analysis-Dynamic Light-Scattering (DLS).

Dynamic viscosity of the aqueous pigment-based inks described herein can be measured by any well-known techniques. Preferred methods include measurement of the timing of mass flow through a capillary as in a capillary viscometer, or measurement of ball drop velocity through a fluid, using for example a rolling ball viscometer. Both a capillary flow viscometer and a commercially available Anton Paar Automated Micro Viscometer (AMVn) employing the rolling ball technique can be used to measure the dynamic viscosities reported herein.

The inventive aqueous ink receptive primer compositions can have a dynamic viscosity, as measured at 25° C. using Brookfield spindle viscometer (Model LVDV+, using spindle SC4-18) that can be obtained commercially, of at least 12 centipoise (12 mPa-sec) or of at least 18 centipoise (18 mPa-sec) and up to and including 20 centipoise (20 mPa-sec) or up to and including 35 centipoise (35 mPa-sec). Such viscometers having necessary spindle sets can be obtained from various commercial sources. As is well known, 1 centipoise is equivalent to 1 mPa-sec.

The Wilhelmy plate method is a well-known technique for measuring the static surface tension of a fluid (such as an inventive aqueous topcoat composition) at a solid interface. The technique involves a plate of known dimensions, typically selected from a roughened platinum alloy, suspended from a balance. The plate is contacted with a fluid of interest and a vertical force is applied to the plate to form a liquid meniscus between the fluid and plate. The resulting surface tension is given according to equation (1):

$$\sigma = F/L \cos(\theta) \quad (1)$$

where σ is the surface tension of the liquid, F is the force acting on the balance (milli-Newtons/meter), L is the wetted length of the plate in millimeters, and θ is the contact angle between the plate and fluid.

Typically, the roughened platinum results in a contact angle very close to zero and the cosine of 0 goes to 1. A complete theoretical treatment of the method can be found in, for example, "A Method for Determining Surface and Interfacial Tension Using a Wilhelmy Plate," *Colloid and Polymer Science,* 255 (7), pages 675-681. A number of commercially available instruments are known for measuring surface tension, however, the instrument used to report surface tension values in the present invention is a Kris Model K10ST tensiometer.

For clarification of definitions for any terms relating to polymers, reference should be made to "Glossary of Basic Terms in Polymer Science" as published by the International Union of Pure and Applied Chemistry ("IUPAC"), *Pure Appl. Chem.* 68, 2287-2311 (1996). However, any definitions explicitly set forth herein should be regarded as controlling.

As used herein, the term "polymer" is used to describe compounds with relatively large molecular weights formed by linking together many small, reacted monomers. As the polymer chain grows, it can fold back on itself in a random fashion to form coiled structures. Water-soluble polymeric binders, such as PVA, are useful in the inventive aqueous ink receptive primer compositions according to the present invention. With the choice of solvents, a polymer can become insoluble as the chain length grows and become discrete polymeric particles dispersed in a solvent medium. These particle dispersions can be very stable and useful in aqueous topcoat compositions according to the present invention. As used herein, unless indicated otherwise, the term "polymer" refers to a non-crosslinked material. Thus, crosslinked polymeric particles differ from the non-crosslinked polymeric particles in that the latter can be dissolved in solvents of good solvating property whereas the crosslinked polymeric particles may swell but do not dissolve in the solvent because the polymer chains are interconnected by strong covalent bonds.

The term "copolymer" refers to polymers composed of two or more different repeating or recurring units that are arranged along or pendant to the polymer backbone.

The term "backbone" refers to the chain of atoms in a polymer to which a plurality of pendant groups can be attached. An example of such a backbone is an "all carbon" backbone obtained from the polymerization of one or more ethylenically unsaturated polymerizable monomers.

Recurring units in some of the polymers described herein are generally derived from the corresponding ethylenically unsaturated polymerizable monomers used in a polymerization process, which ethylenically unsaturated polymerizable monomers can be obtained from various commercial sources or prepared using known chemical synthetic methods. For other polymers described herein, the repeating units in the active polymer can be the result of subsequent chemical reactions with the original repeating units used to make the polymer. For example, poly(vinyl alcohol) can be derived from the hydrolysis of preformed poly(vinyl acetate), which in turn was made by polymerizing vinyl acetate.

Unless otherwise indicated, the term "weight %" refers to the amount of a component or material based on the total weight of an aqueous topcoat composition.

As used herein, the term "layer" or "coating" can consist of one or more disposed or applied layers from one or more sequentially disposed or applied layer formulations. Unless otherwise noted, such layers or coatings are generally nonporous and contiguously cover the specific area of the substrate to which they are applied.

The term "percent (%) solids" refers to the percentage by weight of non-volatile materials in a composition or solution, which can be determined using known gravimetric procedures.

The present invention relates to aqueous ink receptive primer compositions, inkjet receiving media comprising aqueous ink receptive primer compositions, methods of manufacturing such inkjet receiving media, methods of inkjet printing on such inkjet receiving media to prepare inkjet-printed articles. As will become evident in the subsequent discussion and working examples, such aqueous ink receptive primer compositions are disposed on or applied as either a continuous layer or a pattern on top of a water-absorptive substrate prior to inkjet printing with aqueous pigment-based inkjet inks. As such, these aqueous ink receptive primer compositions have also been referred to in the art as "topcoat compositions" or simply "primers" given that their function is to prime the surface to be printed, thereby making it ready for subsequent inkjet printing that results in both excellent print quality as well as adhesion of both the primer and ink to the substrate.

Uses

The inventive aqueous ink receptive primer compositions can be used to provide inventive inkjet-printable media (also known as "inkjet receiving medium" or "inkjet receiving media") that can be advantageously used in high-speed coating and inventive inkjet printing methods, including those utilizing high-speed inkjet printing systems and aqueous anionically-stabilized or anionically-dispersed pigment-based inks. It is particularly useful that such aqueous ink receptive primer compositions are applied to a water-absorptive substrate (for example, paper or other cellulosic-containing materials) in which inventive high-speed inkjet printing processes using aqueous pigment-based inks are used after the aqueous ink receptive primer composition is applied to a water-absorptive substrate.

Aqueous Ink Receptive Primer Compositions

The aqueous ink receptive primer composition according to the present invention generally has a % solids content of at least 8% or of at least 10%, and up to and including 18%, or up to and including 20%, or up to and including 25%. Flexographic coating, gravure coating, and inkjet printing techniques may require different optimal % solids to obtain the most desirable inkjet-printable layers or patterns at the targeted dried thicknesses according to the present invention.

The inventive aqueous ink receptive primer composition described herein must comprise three essential components (a), (b), and (c) as defined below, in order to achieve the advantages of a thin coating as described herein for the inkjet receiving media of the present invention and to address the problems described above.

More specifically, the aqueous ink receptive primer composition according to the present invention must contain component (a) one or more water-soluble salts of a multivalent metal cation. Mixtures of such salts having the same multivalent metal cation, and mixtures of salts having different multivalent metal cations can be used, in any desired proportion. Generally, each of these water-soluble salts is non-reactive with other materials in the aqueous ink receptive primer compositions and are generally colorless in solution.

Useful component (a) one or more water-soluble salts of a multivalent metal cation can comprise one or more multivalent cations such as magnesium (+2), calcium (+2), barium (+2), zinc (+2), or aluminum (+3), and mixtures thereof. The magnesium (+2), calcium (+2), and barium (+2) cations, or combinations thereof, are particularly useful, in combination with suitable counter anions, such as chloride.

Examples of useful component (a) one or more water-soluble salts of a multivalent metal cation include but are not limited to, calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Hydrated versions of these salts can also be used. Other useful component (a) water-soluble salts of a multivalent metal cation would be readily apparent to a skilled artisan. Particularly useful component (a) water-soluble salts of a multivalent metal cation comprise one or more of calcium chloride, calcium acetate, magnesium chloride, magnesium acetate, calcium nitrate, magnesium nitrate, and hydrated versions of these salts. Useful component (a) water-soluble salts of a multivalent metal cation are readily available from various commercial sources.

The amount of the component (a) water-soluble salts of multivalent metal cations (anhydrous basis) in the aqueous ink receptive primer composition used according to the present invention can be at least 0.1 weight % or at least 0.5 weight %, or at least 1 weight % or even at least 2 weight %, and up to and including 10 weight % or up to and including 15 weight % or up to and including 20 weight % or up to and including 30 weight % solids, based on the total weight of the aqueous ink receptive primer composition. The most useful amount of the component (a) water-soluble salts of multivalent metal cations in the inventive aqueous ink receptive primer compositions can be from at least 4 weight % and up to and including 10 weight %. A skilled worker would be able to provide enough of the component (a) water-soluble salts of multivalent metal cations so that the dry weight of such salts in the resulting applied aqueous ink receptive primer composition would fall within the coverages described below.

Another essential component of the aqueous ink receptive primer composition according to the present invention is component (b) one or more water-soluble or water-dispersible polymeric binder materials (identified herein also and particularly below in the working examples as "polymeric binder materials"). It should be understood that depending on the pH of the aqueous ink receptive primer composition, an inherently nonionic water-soluble polymer may become protonated or deprotonated, thereby imparting a net ionic charge on the polymer. Such polymeric binder materials can include but are not limited to poly(vinyl alcohol), polyethylene imine (including protonated polyethylene imine), polyethylene oxide, polyvinyl amine, copolymers derived at least in part from vinyl alcohol and ethylene oxide, copolymers derived at least in part from vinyl amine and vinyl alcohol, and poly(vinyl pyrrolidone), each polymer or copolymer having a weight average molecular weight of at least 50,000 or of at least 60,000 or of at least 80,000, and up to and including 150,000 or up to and including 180,000. A particularly useful weight average molecular weight would be at least 80,000 and up to and including 150,000. Weight average molecular weight for a specific water-soluble or water-dispersible polymeric binder material is defined as the sum of the products of each individual polymeric molecule's mass and its abundance divided by the total sum of all molecular masses. Equipment is commercially available for accomplishing these calculations as is well known by one skilled in the polymer chemistry art. Useful component (b) water-soluble or water-dispersible polymeric binder materials are readily available from various commercial sources or prepared using known synthetic methods and starting materials.

Particularly useful component (b) water-soluble or water-dispersible polymeric binders include but are not limited to, a polyvinyl alcohol, an acetate derivative of polyvinyl alcohol, a copolymer derived at least in part from vinyl alcohol and ethylene oxide, or a combination of two or more of these polymeric materials. For example, a particularly useful component (b) water-soluble or water-dispersible polymeric binder material can be a poly(vinyl alcohol) that has a degree of hydrolysis or at least 87%, or of at least 95%.

Such component (b) one or more water-soluble or water-dispersible polymeric binder materials can be present in the aqueous ink receptive primer composition in an amount of at least 1 weight %, or at least 2 weight %, and up to and including 8 weight % or up to and including 10 weight % or up to and including 20 weight %, based on the total weight of the aqueous ink receptive primer composition. A particularly useful amount of the component (b) one or more water-soluble or water-dispersible polymeric binder materials is at least 2 weight % and up to and including 5 weight % or up to and including 10 weight %. A skilled worker would be able to provide enough of the component (b) one or more water-soluble or water-dispersible polymeric binder materials so that the dry weight of such polymeric binder materials in the resulting disposed aqueous ink receptive primer composition would fall within the coverages described below.

The aqueous ink receptive primer compositions according to this invention also must comprise component (c) fluorine-free wax particles. Such particles may have a Rockwell Hardness of less than or equal to R90, or of less than or equal to R75 wherein the Rockwell Hardness can be determined as described above. Useful component (c) fluorine-free wax particles generally are water-insoluble composites composed of one or more polymers comprising a thermoplastic organic polymeric material such as a polyalkylene (polyethylene or polypropylene), polyester, or polyamide that can be melted, liquified, softened, or otherwise modified such that it can be homogenously combined with a sub micrometer or nanometer scale inorganic material, then solidified, and micronized into a fine powder. Combinations of such thermoplastic materials can be used in making useful component (c) fluorine-free wax particles for the present invention. The polyethylenes are particularly useful as thermoplastic organic polymeric materials. Fluorinated polymers are purposely excluded as thermoplastic materials in the present invention.

A "sub micrometer or nanometer scale inorganic material" is defined as an inorganic particle with a mean particle size below 1,000 nm, or below 500 nm, or even below 100 nm. Submicron ceramic particles, inorganic solids made up of oxides, carbides, carbonates and phosphates, have high hardness, heat resistance and chemical resistance. Combinations of these ceramic submicron powders can be used with thermoplastic organic polymeric materials in making composite component (c) fluorine-free wax particles for the present invention. Such inorganic materials can be also composed of aluminum oxide, titanium oxide, or mixtures thereof in the composites. Aluminum oxide is particularly useful. Fluorine-containing inorganic or organic materials are purposely excluded in such inorganic materials for use in the present invention.

Component (c) fluorine-free waxes are particularly useful if composed of a water-insoluble composite of any of the thermoplastic polymeric materials described above, such as a polyalkylene (such as a polyethylene), with aluminum oxide.

The component (c) fluorine-free wax particles comprising a water-insoluble composite comprising one or more polymers comprising a thermoplastic organic polymeric material and the inorganic material described above can have a mean particle size of at least 2 μm or of at least 3 μm, and up to and including 8 μm, or up to and including 10 μm. Mean particle size can be determined as described above.

The amount of useful (c) fluorine-free wax particles present in the aqueous topcoat composition is generally at least 0.1 weight % or at least 0.3 weight %, and up to and including 1.5 weight, % or up to and including 2 weight %, based on the total weight of the aqueous ink receptive primer composition. A particular useful amount of the (c) fluorine-free wax particles is at least 0.4 weight % and up to and including 1.2 weight %.

Useful component (c) fluorine-free wax particles can be obtained from a variety of commercial sources, including Micro Powders Inc., and useful details of such materials and methods of making them are provided, for example, in U.S. Pat. No. 10,646,412B1 (Czarnecki), the disclosure of which is incorporated herein by reference.

The aqueous ink receptive primer compositions of the present invention can also comprise one or more of each of the following: a defoaming agent (such as a defoaming surfactant), an anti-corrosion compound, a biocide, a crosslinking agent, and a preservative, or combinations thereof, each in suitable amounts that one skilled in the art would know. Such addenda can be obtained from a number of commercial sources, and compounds that act as defoaming agents are usually described as such, and such materials can be readily tested to see which compound is best for a particular aqueous ink receptive primer composition.

It can be useful to include silica (silicon dioxide) particles in the aqueous ink receptive primer composition to help keep the component (c) fluorine-free wax particles in suspension. Such silica particles can have an average particle size of at least 4 nm and up to and including 100 nm, and they can be present in an amount of at least 0.3 weight % or of at least 0.5 weight % and up to and including 1.2 weight % or up to and including 1.8 weight %, based on the total weight of the aqueous ink receptive primer composition. Useful silica particles, especially colloidal silica particles, of this type can be obtained from any of various commercial sources. Useful colloidal silica particles can be aluminum-stabilized colloidal silica particles.

The three essential components (a), (b), and (c) noted above, and any optional components can be mixed in suitable proportions, at a suitable temperature and time, and in a suitable order of addition in an aqueous medium in order to obtain a stable aqueous ink receptive primer composition according to the present invention, representative examples of which are described below in the examples. The aqueous medium is predominantly water in an amount to provide the desired % solids noted above. At least 50 weight %, or at least 70 weight %, or even at least 90 weight % and up to 100 weight % of the aqueous medium is comprised of water, based on the total weight of all solvents in the aqueous medium.

Inkjet Receiving Media

Figure 2:
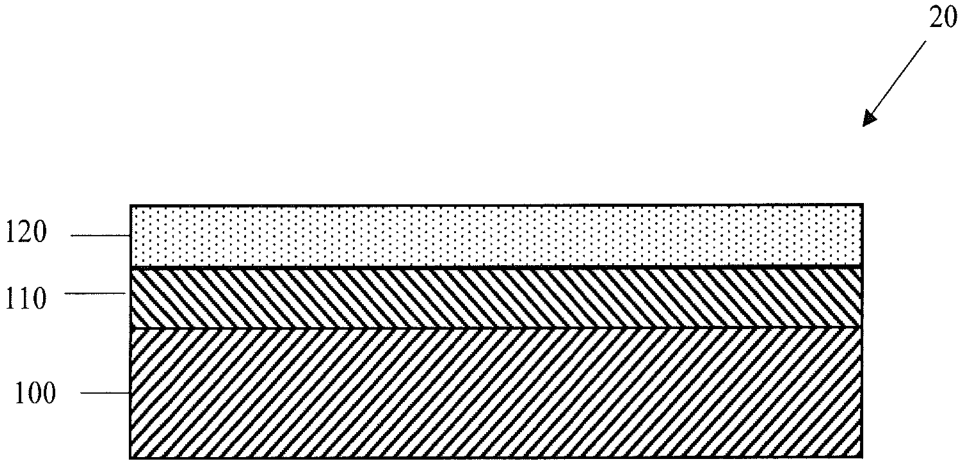
FIG. 2 shows a partial cross-sectional view of an embodiment of an inkjet-printed article according to the present invention comprising an aqueous ink receptive primer composition between a water-absorptive substrate and an inkjet-printed layer or image.

As shown in FIG. 1, a simple illustrated embodiment according to the present invention is inkjet receiving medium 10 having water-absorptive substrate 100 (such as comprising one or more cellulosic materials) on which is disposed aqueous ink receptive primer composition 110, and water-absorptive substrate 100 and disposed aqueous ink receptive primer composition 110 are contiguous or in direct contact with each other. In general, water-absorptive substrate 100 is generally opaque and composed of materials described below. Disposed aqueous ink receptive primer composition 110 can be in wet or dry form during inkjet printing but it is present in preferably substantially dry form. While disposed aqueous ink receptive primer composition 110 is shown in FIGS. 1 and 2 as a defined straight line, it is to be understood that the outer surface can have some roughness or surface perturbations due to the presence of the component (c) fluorine-free wax particles that may protrude through the outer surface or be just under the outer surface, forming microscopic bumps or perturbations in the surface.

Suitable water-absorptive substrates useful in the practice of the present invention can be typically planar in nature with two opposing surfaces or supporting sides. They can have a single "layer" or stratum or be composed of multiple layers or strata composed of the same or different cellulosic materials. As used herein, "cellulosic materials" refers to materials generally derived from and comprised of predominantly cellulose, although some other natural or synthetic materials can be included in small amounts (less than 25% of the total). In most embodiments, a water-absorptive substrate comprises a predominant cellulosic material, such as a paper of some type that can be sized or size-press coated as is typically done in the papermaking art. For example, the inventive inkjet receiving medium can have a water-absorptive substrate that comprises one or more cellulosic materials in one or multiple layers.

Thus, useful cellulosic materials from which water-absorptive substrate 100 can be constructed, include but are not limited to, glossy, semi-glossy, or matte-coated lithographic offset papers that typically comprise a paper base (support) that has been coated with a clay or similar sizing materials and has undergone surface calendering treatment to provide a desired surface smoothness. Such water-absorptive substrates include both glossy coated and matte coated lithographic offset papers and can be obtained from various commercial sources including for example International Paper, Sappi, NewPage, Appleton Coated, Abitibi-Bowater, Mohawk Papers, Verso, Mitsubishi, Norpac, Domtar, and others readily known to a skilled artisan.

In many embodiments, the cellulosic material can be readily hydrophilic and capable of absorbing and transferring aqueous pigment-based ink colorants (such as pigment colorants) to the water-absorptive substrate interior prior to the aqueous ink receptive primer composition being disposed thereon in an appropriate manner. Such a hydrophilic cellulosic substrate is thus porous to some extent.

Other useful water-absorptive substrates include coated and uncoated offset papers and other plain papers, as well as any other cellulosic materials typically used as inkjet receiving media such as resin-coated papers, plain coated and uncoated papers, photographic paper supports, melt-extrusion-coated papers, and laminated papers such as biaxially oriented support laminates such as those described in Col. 6 (line 50) to Col. 7 (line 2) of U.S. Pat. No. 9,067,448 (noted above).

FIG. 2 illustrates another embodiment according to this invention in which inkjet recording medium 20 comprises water-absorptive substrate 100 as described above and disposed aqueous ink receptive primer composition 110 on at least one surface of water-absorptive substrate 100, on which inkjet-printed image 120 comprises one or more aqueous pigment-based inks (described below).

The inventive aqueous ink receptive primer composition can be disposed on the water-absorptive substrate surface in various ways using a number of application methods and means as described in more detail below. For example, it can be disposed on the water-absorptive substrate as a continuously distributed layer, meaning that the layer is generally uniform in coating coverage and there are no parts of the water-absorptive substrate surface that are not intentionally covered by the aqueous ink receptive primer composition. Such layers or coatings can be applied using flexography, gravure, or other known coating techniques and apparatus known in the coating arts.

Alternatively, the inventive aqueous ink receptive primer composition can be disposed on the water-absorptive substrate surface as a pattern (or image) that can be provided using, for example, flexography and suitably patterned flexographic printing sleeves or gravure and suitably engraved gravure cylinders.

For all of the inkjet recording media embodiments according to the present invention, the resulting disposed aqueous ink receptive primer composition generally has a coating weight (or coating coverage) of at least 0.1 $g/m^2$ or of at least 0.2 $g/m^2$ and up to and including 0.8 $g/m^2$, up to and including 2 $g/m^2$, up to and including 5 $g/m^2$, or up to and including 8 $g/m^2$. The disposed aqueous ink receptive primer composition can be dried if desired so that less than 10 weight % of the original water is present.

Within such disposed aqueous ink receptive primer composition on a surface of a water-absorptive substrate, the component (a) one or more water-soluble salts of a multivalent metal cation, as described above, are generally present in an amount of at least 20 weight %, or of at least 40 weight % or of at least 60 weight %, and up to and including 80 weight %, based on the total weight of the aqueous ink receptive primer composition (in substantially dry form). In general, the useful coverage of the dry topcoat composition will provide at least 40 weight % and up to and including 80 weight % of the multivalent metal cation, based on the total weight of the disposed aqueous ink receptive primer composition (that can be in substantially dry form).

For example, the component (a) one or more water-soluble salts of a multivalent metal cation can be present in an amount sufficient to provide the multivalent cation (such as calcium cation) in the disposed aqueous ink receptive primer composition (in substantially dry form), for example in an amount of at least 0.01 $g/m^2$ and up to and including 2 $g/m^2$ or up to and including 4 $g/m^2$.

In addition, the component (b) one or more water-soluble or water-dispersible polymeric binder materials, as described above, can be present in the disposed aqueous ink receptive primer composition in an amount of at least 10 weight % or at least 15 weight %, and up to and including 35 weight % or up to and including 40 weight %, based on the total weight of the disposed aqueous ink receptive primer composition.

The essential component (c) fluorine-free wax particles as described above are present in the disposed aqueous ink receptive primer composition in an amount of at least 2.5 weight %, and up to and including 8 weight % or up to and including 12 weight %, based on the total weight of the disposed aqueous ink receptive primer composition. As noted above, particularly useful (c) fluorine-free wax particles comprise nanocomposite particles of a polyethylene with aluminum oxide.

The disposed aqueous ink receptive primer composition can also comprise one or more of the optional addenda described above, such as defoaming agents, surfactants, crosslinking agents, anti-corrosion compounds, biocides, preservatives, and combinations thereof, and silica particles as noted above if desired. Defoaming agents and silica particles are particularly useful in the disposed aqueous ink receptive primer composition.

The resulting inkjet recording medium can be used for various purposes, but it is particularly useful for inkjet printing methods to provide a monochrome or multi-chrome (or multicolor) inkjet-printed image or layer in an inventive inkjet-printed article. Such inventive inkjet-printed articles have a water-absorptive substrate and a disposed aqueous ink receptive primer composition on which an aqueous-based inkjet-printed image or layer is disposed over (for example, directly disposed on with no intermediate layers), for example as illustrated in each of FIGS. 1 and 2.

As described in more detail below, an inkjet-printed image or layer can be formed by inkjet printing, particularly at high speeds (for example at a printing speed of at least 50 meters/minute), of one or more aqueous pigment-based inks that are described below.

Method for Making Inkjet Receiving Media

An inventive aqueous ink receptive primer composition according to this invention can be used to prepare or form a disposed layer or pattern on one or both opposing sides (or surfaces) of a water-absorptive substrate (as described above). Thus, a water-absorptive substrate is chosen (or provided as in Step A of the present invention) and an aqueous ink receptive primer composition according to this invention is formulated and disposed on at least one surface thereof (according to step B of the present invention) and dried at a suitable time (before or simultaneously with inkjet-printed aqueous pigment-based inks). The result of these operations is an inkjet receiving medium according to the present invention useful for inkjet printing according to this invention.

The procedures and apparatus used to accomplish these operations in step B) can be selected from various known techniques and apparatus, including but not limited to spraying, rod coating, blade coating, forward roll coating, gravure coating, (direct, reverse, or offset), flexographic printing, size press (puddle and metered), extrusion hopper coating, and curtain coating, using suitable equipment for these purposes.

In some embodiments, an aqueous ink receptive primer composition can be disposed or provided on a water-absorptive substrate surface in an in-line process as part of water-absorptive substrate manufacturing (such as during a paper making process). Alternatively, an aqueous ink receptive primer composition can be disposed on a water-absorptive substrate surface in a separate step after the manufacture of the water-absorptive substrate. In still other embodiments, the aqueous ink receptive primer composition can be disposed in-line as part of an inkjet printing operation, wherein the aqueous ink receptive primer composition is disposed on the water-absorptive substrate surface in a "pre-coating" or "pre-treatment" station prior to printing of one or more aqueous pigment-based inks using a multi-station high-speed inkjet printing apparatus. Such pre-coating operations can be designed to provide uniform (continuous) of "flood coated" coverage of the resulting aqueous ink receptive primer composition, or in some instances, only a specific area of the water-absorptive substrate can be provided with the aqueous ink receptive primer composition to form a disposed pattern or image. While the disposed aqueous ink receptive primer composition can be dried significantly before inkjet printing, drying may not be necessary and overall drying of both disposed aqueous ink receptive primer composition and inkjet-printed image or layer can be carried out at the same time. For example, various application techniques such as gravure coating or flexographic printing can be used to dispose the aqueous ink receptive primer composition in a pattern or image followed by inkjet printing in registration with that pattern.

If an inkjet-printed medium is prepared with multiple sub-layers for the water-absorptive substrate, a first layer can be formed using techniques and equipment described above for the aqueous ink receptive primer composition. For example, the first layer and aqueous ink receptive primer composition can be separately disposed or formed on the water-absorptive substrate in distinct or separate coating operations with an intermediate drying operation. Alternatively, the first layer can be formed in-line as part of an inkjet receiving media manufacturing or an inkjet printing operation so that multiple layers are formed or applied sequentially with or without drying between layer applications using a multi-station apparatus. Further details of such processes are provided in Cols. 7-8 of U.S. Pat. No. 9,376,582 (Dannhauser et al.), the disclosure of which is incorporated herein by reference. The formation of multiple layers in one operation to produce inkjet receiving media is also possible using slide-hopper and curtain coating techniques.

Method and Apparatus for Inkjet Printing

Inkjet receiving media according to the present invention can be inkjet printed (for example in step B' or step B" of the present invention) with one or more aqueous pigment-based inks comprising one or more pigment colorants to provide an inkjet-printed pigment image or layer containing one or more water-insoluble pigments. These aqueous pigment-based inks can be printed onto the disposed aqueous ink receptive primer composition (whether dry or still wet) of the inkjet receiving media designed and prepared as described above (for example, as part of step A' or step A" of the present invention). The inkjet printing methods according to the present invention can be used for printing periodicals, newspapers, magazines, greeting cards, lottery tickets, paperboard, advertising materials, various labels, and other cellulosic materials that would be readily apparent to one skilled in the art.

While the aqueous ink receptive primer compositions according to this invention can be useful when incorporated into inkjet receiving media useful in one or more drop-on-demand (DOD) printing systems, the advantages of the present invention are particularly evident when the inkjet printing method according to the present invention is carried out, as described above, using continuous inkjet printing processes and equipment at high inkjet printing speeds (for example, inkjet printing at a speed of at least 50 m/min). There are various high-speed printing processes known in the art and they can be known as "continuous inkjet printing" (CIJ) processes, and the present invention is not limited to a particular high-speed inkjet printing process, but there may be certain high-speed inkjet printing processes that are more useful than others. In general, such high-speed inkjet printing processes can be accomplished using one or more aqueous pigment-based inks that are ejected through one or more printheads (containing nozzles) and unprinted aqueous pigment-based ink is collected and recycled through the printing system one or more times until it is used up. In addition, a high-speed inkjet printing system can have incorporated replenisher systems. Details of such inkjet printing processes and equipment, including high-speed CIJ printing processes, are described for example in U.S. Pat. No. 8,173,215B1 (Sowinski et al.), the disclosure of which is incorporated herein by reference. Other details about useful high-speed inkjet printing systems and equipment are provided for example in U.S. Pat. No. 6,588,888B1 (Jeanmaire et al.), 6,554,410B1 (Jeanmaire et al.), 6,682,182B1 (Jeanmaire et al.), 6,793,328B1 (Jeanmaire et al.), 6,866,370B1 (Jeanmaire et al.), 6,575,566B1 (Jeanmaire et al.), 6,517,197B1 (Hawkins et al.), 6,943,037B1 (Anagnostopoulos et al.), 6,554,410B1 (Jeanmaire et al.), 6,682,182B1 (Jeanmaire et al.), 6,793,328B1 (Jeanmaire), 6,517,197B1 (Hawkins et al.), 6,866,370B1 (Jeanmaire), and 6,575,566 (Jeanmaire et al.), and in U.S. Patent Application Publications 2003/0202054A1 (Jeanmaire et al.) and 2002/0202054A1 (Jeanmaire et al.), the disclosures of all of which are incorporated herein by reference. A simple schematic of a useful high-speed CIJ printing system is provided in FIG. 1 of U.S. Pat. No. 8,764,161B1 (Cook et al), the disclosure of which is incorporated herein by reference.

In some high-speed printing processes, each aqueous pigment-based ink can be ejected or printed from a main fluid supply dedicated to it only, as a continuous stream of the aqueous pigment-based ink that is broken into both printing drops and non-printing drops. If drops of a specific aqueous pigment-based ink are not deposited onto an inkjet receiving medium during a specific printing run, those ink drops are known in the art as "non-printing drops" and are generally collected using suitable collecting means such as a "catcher" and returned to its respective main fluid supply. This entire scenario can be carried out using a single aqueous pigment-based ink alone, or by using it in combination with one or more additional aqueous pigment-based inks having the same or different "colors" or hues as the first mentioned aqueous pigment-based ink. The one or more aqueous pigment-based inks can be inkjet printed in a chosen sequence on a controlled manner basis guided by software and digital input to provide a single-color or multicolor inkjet-printed image on the surface of the inventive inkjet receiving medium containing the inventive aqueous ink receptive primer composition.

In addition, and if desired, inkjet printing of an aqueous "colorless" (or aqueous pigment-free) ink composition or fluid can be carried out in place of, simultaneously with, or sequentially with inkjet printing of one or more "colored" aqueous pigment-based inks as described in U.S. Patent Application Publication 2018/0051184A1 (Lussier et al.), the disclosure of which is incorporated herein by reference.

Printer replenishment systems for maintaining quality of an aqueous pigment-based ink and to counter the effects of volatile component evaporation and that measure ink electrical resistivity are described for example in U.S. Pat. No. 5,526,026 (Bowers), the disclosure of which is incorporated herein by reference and in EP 0597628B1 (Loyd et al.). Useful continuous inkjet printing processes and equipment that employ other means for aqueous pigment-based ink concentration sensing are disclosed in U.S. Pat. No. 7,221,440B1 (McCann et al.), the disclosure of which is incorporated herein by reference, and in EP 0 571,784B1 (McCann et al.) and EP 1,013,450B1 (Woolard et al.).

Printing equipment and systems can also be designed to include a replenishment system for supplying the aqueous ink receptive primer composition as evaporation and use diminish the concentration.

In some embodiments, the method according to the present invention can be carried out by printing one or more aqueous pigment-based inks onto the disposed aqueous ink receptive primer composition of an inkjet receiving medium to provide a pigment-based image in a predetermined pattern using an inkjet deposition system in response to electrical signals, and this predetermined pattern can be inkjet-printed in registration with a pattern of the disposed aqueous ink receptive primer composition.

An aqueous pigment-based ink useful according to the present invention can be prepared from a suitable aqueous dispersion of one or more particulate pigments using known dispersants and dispersing means. The resulting aqueous pigment-based ink can be mixed with one or more humectants or co-solvents and the components can be formulated in an aqueous medium (predominantly water).

Thus, each useful aqueous pigment-based ink typically comprises one or more particulate, organic, or inorganic pigment colorants that will provide the desired color or hue such as black, green, red, yellow, blue, violet, magenta, cyan, white, brown, grey, and other hues known in the art. Pigment colorants can be present individually or in mixtures in each aqueous pigment-based ink. For example, aqueous pigment-based inks useful in the present invention can comprise one or more pigment colorants selected from a cyan pigment, a magenta pigment, a yellow pigment, a black pigment, a green pigment, an orange pigment, a white pigment, a red pigment, a blue pigment, a violet pigment, and a combination of any of these pigment colorants, and desirably, each and all of these pigments can be anionically-stabilized as described below. Useful pigments are well known in the art and some can be purchased from commercial sources. Useful self-dispersing pigment colorants are described for example, in Col. 10 (lines 66) to Col. 11 (line 40) of U.S. Pat. No. 8,455,570B1 (Lindstrom et al.), the disclosure of which is incorporated herein by reference.

It is particularly desirable that the pigment colorants used in the present invention in the aqueous pigment-based inks, are stabilized with anionic moieties (that is, they are "anionically stabilized pigments") whether they are self-dispersed or dispersed using known dispersing aids. In some embodiments, the one or more aqueous pigment-based inks further comprise an anionic polymer having an acid number of at least 50 and also comprise one or more anionically-stabilized pigment colorants.

Useful pigment colorants can have a median particle diameter of less than 150 nm and more likely less than 100 nm or even less than 50 nm. As used herein, the term "median particle diameter" refers to the $D_{50}$ of the classified particle size distribution such that 50% of the volume of the pigment colorant particles is provided by particles having diameters smaller than the indicated diameter.

Organic or inorganic pigment colorants can be present in each aqueous pigment-based ink in an amount of at least 0.1 weight % and up to and including 30 weight %, based on the total weight of the aqueous pigment-based ink.

Each aqueous pigment-based ink generally comprises one or more humectants that are generally water soluble or water miscible organic solvents. Representative humectants are described for example, in U.S. Pat. No. 9,783,553B2 (Lussier et al.), the disclosure of which is incorporated herein by reference. The one or more humectants can be present in an amount of at least 0.5 weight %, or of at least 1 weight % and up to and including 10 weight %, based on the total weight of that aqueous pigment-based ink.

Each aqueous pigment-based ink useful according to the present invention can further comprise one or more anionic polyurethanes, each having an acid number of at least 50 or of at least 60, and up to and including 150. Alternatively, or in addition to the anionic polyurethanes, the aqueous pigment-based ink can comprise one or more anionic (meth) acrylic or anionic styrene-(meth) acrylic polymers, each having an acid number of at least 50, or of at least 120 and up to and including 240. The term (meth)acrylic refers to both acrylic materials and methacrylic materials. Representative anionic (meth)acrylic polymers and anionic styrene-(meth)acrylic polymers useful in the present invention are described for example in [0061] of U.S. Patent Application Publication 2008/207811A1 (noted above).

Representative examples of both types of polymers are described for example in U.S. Pat. No. 8,430,492B2 (Falkner et al.) and 9,783,553B2 (noted above), the disclosures of which are incorporated herein by reference. Particularly useful anionic polyurethanes contain a polyether diol unit and can be identified as polyether polyurethanes and can be individually represented by Structure (I) in U.S. Pat. No. 9,783,553B2 (noted above). Other useful water-soluble or water-dispersible anionic polyether polyurethanes can be prepared as described for example in [0045]-[0049] of U.S. Patent Application Publication 2008/0207811A1 (Brust et al.), the disclosure of which is incorporated herein by reference.

Colorless fluorescent colorants (dyes or pigments) can also be present in the aqueous pigment-based ink as described in U.S. Patent Application Publication 2014/231674A1 (Cook), the disclosure of which is incorporated herein by reference.

Other additives that can be present in the aqueous pigment-based inks, in amounts that would be readily apparent to one skilled in the art, include but are not limited to, co-solvents, thickeners, conductivity-enhancing agents, drying agents, waterfast agents, viscosity modifiers, pH buffers, preservatives, antifoamants, wetting agents, corrosion inhibitors, biocides, fungicides, defoamers, UV radiation absorbers, antioxidants, and light stabilizers, as well as other additives described in Col. 17 (lines 11-36) of U.S. Pat. No. 8,455,570B2 (noted above).

Water is generally present in each aqueous pigment-based ink in an amount of at least 75 weight % or at least 80 weight %, and generally at no more than 90 weight %, based on the total weight of the aqueous pigment-based ink.

The various aqueous pigment-based inks useful according to the present invention can be supplied individually or as components of ink sets that can be designed for use in the same high-speed inkjet printing process and equipment. Aqueous ink receptive primer compositions can also be supplied individually or as part of inkjet printing sets including one or more aqueous pigment-based inks.

Inkjet Printed Articles

Inkjet-printed articles prepared according to the present invention comprise a water-absorptive substrate (as described above) on which an aqueous ink receptive primer composition has been disposed (as described above), and on which at least one aqueous pigment-based inkjet-printed image or layer has been disposed by inkjet printing, and particularly by a high-speed continuous inkjet printing process and apparatus.

Some methods of the present invention can include, after inkjet printing one or more aqueous pigment-based inks on the aqueous ink receptive primer composition to provide a pigment-based image or layer, applying [step C')] an aqueous colorless ink composition as is known in the art, to the pigment-based image or layer.

The resulting inkjet-printed article according to this invention can have a disposed aqueous ink receptive primer composition present as a pattern or layer on the water-absorptive substrate surface, and a pigment-based inkjet-printed pattern (or image) that can be arranged in registration with that pattern or layer of the disposed aqueous ink receptive primer composition. In addition, an aqueous-based colorless ink composition can be disposed as a pattern in registration with the pigment-based inkjet-printed pattern or image in this particular inkjet-printed article.

A transparent protective layer can be used as a post-print functional layer to protect the inkjet-printed article against environmental and physical damage and stress, for example to provide abrasion resistance, resistance to fingerprints, and delamination resistance. Such transparent protective layers can be provided as described in U.S. Patent Application Publication 2018/0051184A1 (noted above), the disclosure of which is incorporated herein by reference.

The present invention provides at least the following embodiments and combinations thereof, but other combinations of features are considered to be within the present invention as a skilled artisan would appreciate from the teaching of this disclosure:

1. An aqueous ink receptive primer composition for pre-treating a water-absorptive substrate prior to inkjet printing thereon, the aqueous ink receptive primer composition having at least 8% solids and up to and including 25% solids, and comprising at least the following components (a), (b), and (c):

(a) one or more water-soluble salts of a multivalent metal cation, which (a) one or more water-soluble salts are present in a total amount of at least 0.1 weight % and up to and including 30 weight %;

(b) one or more water-soluble or water-dispersible polymeric binder materials that are present in a total amount of at least 1 weight % and up to and including 20 weight %, each of which (b) one or more water-soluble or water-dispersible polymeric binder materials has a weight average molecular weight ($M_w$) of at least 50,000 and up to and including 180,000;

(c) fluorine-free wax particles composed of a water-insoluble composite comprising one or more polymers comprising a polyalkylene, a polyester, or a polyimide, and present in an amount of at least 0.1 weight % and up to and including 2 weight %, wherein the amounts of the components (a), (b), and (c) are based on the total weight of the aqueous ink receptive primer composition.

2. The aqueous ink receptive composition of embodiment 1, wherein the component (c) fluorine-free wax particles are composed of a water-insoluble composite comprising a polyalkylene with aluminum oxide.

3. The aqueous ink receptive primer composition of embodiment 1 or 2, wherein the component (b) one or more water-soluble or water-dispersible polymeric binder materials consist essentially of poly(vinyl alcohol) having at least 87% degree of hydrolysis.

4. The aqueous ink receptive primer composition of any of embodiments 1 to 3, further comprising silica particles.

5. The aqueous ink receptive primer composition of embodiment 4, wherein the silica particles are colloidal silica particles, and are present in an amount of at least 0.3 weight % and up to and including 1.8 weight %, based on the total weight of the aqueous ink receptive primer composition.

6. The aqueous ink receptive primer composition of embodiment 5, wherein the colloidal silica particles are aluminum-stabilized colloidal silica particles.

7. The aqueous ink receptive primer composition of any of embodiments 1 to 6, wherein the component (b) one or more water-soluble or water-dispersible polymeric binder materials comprise one or more of a polyvinyl alcohol, an acetate derivative of polyvinyl alcohol, a copolymer derived at least in part from vinyl alcohol and ethylene oxide, or a combination of two or more of these polymeric materials.

8. The aqueous ink receptive primer composition of any of embodiments 1 to 7, wherein the component (a) one or more water-soluble salts of a multivalent metal cation comprise one or more water-soluble salts of magnesium (+2), calcium (+2), barium (+2), zinc (+2), or aluminum (+3).

9. The aqueous ink receptive primer composition of any of embodiments 1 to 8, further comprising one or more of a defoaming agent, an anti-corrosion compound, a biocide, a crosslinking agent, and a preservative, and a combination thereof.

10. The aqueous ink receptive primer composition of any of embodiments 1 to 9, comprising an aqueous medium composed of at least 70 weight % water, based on the total weight of all solvents in the aqueous medium.

11. The aqueous ink receptive primer composition of any of embodiments 1 to 10, wherein the component (a) one or more water-soluble salts of a multivalent metal cation, are present in a total amount of at least 1 weight % and up to and including 15 weight %, based on the total weight of the aqueous ink receptive primer composition.

12. The aqueous ink receptive primer composition of any of embodiments 1 to 11 having at least 10% solids and up to and including 20% solids.

13. The aqueous ink receptive primer composition of any of embodiments 1 to 12, wherein component (b) one or more water-soluble or water-dispersible polymeric binder materials are present in a total amount of at least 2 weight % and up to and including 10 weight %, based on the total weight of the aqueous ink receptive primer composition.

14. The aqueous ink receptive primer composition of any of embodiments 1 to 13, wherein each of the component (b) one or more water-soluble or water-dispersible polymeric binder materials has a weight average molecular weight ($M_w$) of at least 80,000 and up to and including 150,000.

15. The aqueous ink receptive primer composition of any of embodiments 1 to 14, wherein the component (c) fluorine-free wax particles are present in an amount of at least 0.3 weight % and up to and including 1.5 weight %, based on the total weight of the aqueous ink receptive primer composition.

16. An inkjet receiving medium comprising a water-absorptive substrate and the aqueous ink receptive primer composition of any of embodiments 1 to 15 disposed on a surface thereof, which disposed aqueous ink receptive primer composition comprises the following components (a), (b), and (c):

(a) one or more water-soluble salts of a multivalent metal cation, which component (a) one or more water-soluble salts are present in a total amount of at least 20 weight % and up to and including 80 weight %;

(b) one or more water-soluble or water-dispersible polymeric binder materials that are present in a total amount of at least 10 weight % and up to and including 40 weight %, each of which component (b) one or more water-soluble or water-dispersible polymeric binder materials has a weight average molecular weight ($M_w$) of at least 50,000 and up to and including 180,000; and (c) fluorine-free wax particles composed of a water-insoluble composite comprising one or more polymers comprising a polyalkylene, a polyester, or a polyimide and present in an amount of at least 2.5 weight % and up to and including 12 weight %, and wherein the amounts of the components (a), (b), and (c) are based on the total weight of the disposed aqueous ink receptive primer composition.

17. The inkjet receiving medium of embodiment 16, wherein the disposed aqueous ink receptive primer composition has a dry solids coating weight of at least 0.1 g/$m^2$ and up to and including 8 g/$m^2$.

18. The inkjet receiving medium of embodiment 16 or 17, wherein the disposed aqueous ink receptive primer composition has a dry solids coating weight of at least 0.2 g/$m^2$ and up to and including 5 g/$m^2$.

19. The inkjet receiving medium of any of embodiments 16 to 18, wherein the disposed aqueous ink receptive primer composition has a dry solids coating weight of at least 0.2 g/$m^2$ and up to and including 2 g/$m^2$.

20. The inkjet receiving medium of any of embodiments 16 to 19, wherein the component (c) fluorine-free wax particles are composed of a water-insoluble composite comprising a polyalkylene with aluminum oxide.

21. The inkjet receiving medium of any of embodiments 16 to 20, wherein the disposed aqueous ink receptive primer composition further comprises silica particles.

22. The inkjet receiving medium of any of embodiments 16 to 21, wherein the component (b) one or more nonionic water-soluble or water-dispersible polymeric binder materials are present in a total amount of at least 15 weight % and up to and including 35 weight %, based on the total weight of the disposed aqueous ink receptive primer composition.

23. The inkjet receiving medium of any of embodiments 16 to 22, wherein the component (c) fluorine-free wax particles are composed of a composite of polyethylene with aluminum oxide and are present in an amount of at least 2.5 weight % and up to and including 8 weight %, based on the total weight of the disposed aqueous ink receptive primer composition.

24. The inkjet receiving medium of any of embodiments 16 to 23, wherein the water-absorptive substrate comprises one or more cellulosic materials in one or multiple layers.

25. The inkjet receiving medium of any of embodiments 16 to 24, wherein the water-absorptive substrate is a glossy, semi-glossy, or matte-coated lithographic offset paper.

26. A method for providing an inkjet receiving medium according to any of embodiments 16 to 25, the method comprising, in order the following steps A) and B):

A) providing a water-absorptive substrate; and

B) disposing the aqueous ink receptive primer composition of any of embodiments 1 to 15 onto at least one surface of the water-absorptive substrate, to provide an inkjet receiving medium having a disposed aqueous ink receptive primer composition on the at least one water-absorptive substrate surface.

27. The method of embodiment 26, wherein step B) is carried out using forward roll coating or flexographic printing.

28. The method of embodiment 26 or 27, wherein step B) is carried out subsequently to preparing the water-absorptive substrate in an in-line process.

29. The method of any of embodiments 26 to 28, wherein the disposed aqueous ink receptive primer composition has a dry solids coating weight of at least 0.1 g/$m^2$ and up to and including 8 g/$m^2$.

30. The method of any of embodiments 26 to 29, wherein the water-absorptive substrate is a glossy, semi-glossy, or matte-coated lithographic offset paper.

The following Examples are provided to illustrate the practice of this invention and are not meant to be limiting in any manner. The materials for which a particular commercial source is not described can be obtained from various commercial sources that would be readily apparent to one skilled in the art.

Preparation of Aqueous Ink Receptive Primer Compositions:

To prepare the aqueous ink receptive primer compositions described in the following examples, the following materials were used: modified poly(vinyl alcohol) copolymer (PVA) Z-320 polymer containing reactive acetacetyl groups (from Nippon Gohsei); poly(vinyl alcohol) (PVA) SELVOL™ 103, SELVOL™ 325, SELVOL™ 310, and SELVOL™ 520 (all from Sekisui); calcium chloride, anhydrous (Briner's Choice); wax particles marketed as MICROSPERSION® 150-50, 6515AL-40, 611-50, 611AL-50, 1226XF-50, 526E, and 504E, (all from Micro Powders, Inc), CARBOWET® 106 nonionic wetting additive (from Air Products); TRITON™ CF-32, defoaming agent (from Dow Chemical).

Unless otherwise identified, the aqueous ink receptive primer compositions described below were coated on a water-absorptive substrate that was 60 #Sterling Ultra Gloss.

Example 1: Formulation and Demonstrated Use of Control Aqueous Ink Receptive Primer Composition A "control" (non-inventive) aqueous ink receptive primer composition outside of the present invention was prepared according to the formulation weight percentages shown in the following TABLE I. Distilled water, corrosion inhibitor, surfactant, and PVA polymer were first mixed at room temperature and then heated to 80-90° C. for 1 hour to dissolve the PVA. The temperature of the formulation was then reduced to 30-40° C., at which time fluorine-containing wax particles and calcium chloride were added, with stirring between addition of the components. The resulting Control aqueous ink receptive primer composition was stirred for 30 minutes and its sample weight was adjusted to compensate for evaporation of water.

TABLE I

| Control Aqueous Ink Receptive Primer Composition Formulation | |
|---|---|
| Component | Weight % |
| Poly(vinyl alcohol) Z-320 | 3.5% |
| Calcium chloride, anhydrous | 8% |
| MICROSPERSION ® 150-50 fluorinated wax particles | 0.7% |
| CARBOWET ® 106 wetting additive | 0.15 |
| Other addenda* | 0.45% |
| Deionized water | Balance to reach 100% |

*Corrosion inhibitors (benzotriazole, EDTA), SURFYNOL ® DF-66, defoaming agent, surfactant (SURFYNOL ® AD-01), crosslinking agent (POLYCUP ™ 9700)

Inkjet receiving media were prepared using a Contiweb Variable Coater that is a forward roll coating apparatus manufactured by Contiweb suitable for applying uniform coatings to a fast-moving web.

The Contiweb Variable Coater is described as follows: it is a three roller per side fluid applicating coater that appears very similar to a flexographic printer. It is capable of either simplex (single side) coating or duplex (two opposing sides) coating. The system consists of a metering roller, a ductor roller, and a transfer roller on each side, and the transfer rollers act as each other's backing roller. The metering roller is a smooth rubber roller partially immersed in a tray of fluid. The metering roller picks up the fluid and applies it to the ductor roller. The ductor roller is a smooth steel roll that then transfers the fluid to the transfer roller that is another smooth rubber roll that finally applies the fluid to the web. A pump system feeds the tray in which the metering roller sits, and the level of fluid is monitored by a control system. Coating laydown is determined by the tray level in a mass balance of infeed vs. outfeed fluid flow, as the pump is programmed to maintain fluid level. Therefore, if the tray level changes, the infeed and outfeed are not equivalent, resulting in a deviation from laydown setpoint. After a calibration is performed to correlate pump RPM to fluid volumetric flow, the target laydown in g/m$^2$ can be entered into Human Machine Interface (HMI). A calibration is required for each fluid to account for changes in viscosity and other physical properties. A calculation is run by the control system with the width of the web, web speed, and volumetric flow of fluid to determine the laydown. The laydown to the web is controlled predominately by increasing or decreasing the gap between the metering and ductor rollers. A smaller gap (more negative) reduces the laydown to the web, while a wider gap (more positive, closer to 0 μm) increases the laydown to the web. The speeds of the metering roller and ductor roller can also be used to control fluid laydown but are not the preferred method. In duplex coating, coating of each opposing side of a web is independently controlled to account for variances in roll quality or calibration, to maintain the setpoint laydown side to side, or even to have two separate laydowns.

Control inkjet receiving media were prepared using the Control aqueous ink receptive primer composition formulation described above, by varying the web speed and coat weight over a wide range during application to the water-absorptive substrate described above. The web speed setpoints for this set of coatings were 150, 300, and 500 feet/minute (45, 90, and 150 m/minute, respectively), respectively, and wet coverages of the forward roll coating apparatus were set to 1.0, 2.5, and 3.5 g/m$^2$, respectively. For each coated Control aqueous ink receptive primer composition, the relative amount of mist produced during the coating process was evaluated (either none, low, medium, or high), and each coating was inspected for coating defects arising from regions of nonuniformity. The results shown in TABLE II below illustrate that mist and coating defects increased with web speed.

To better understand the impact of formulation and coating changes on print quality, samples of the resulting Control inkjet receiving media were each inkjet-printed with an aqueous magenta pigment-based ink in a ten-step density target using a small-scale continuous inkjet (CIJ) printing test image as described in U.S. Pat. No. 10,894,437 (Putnam et al.), the disclosure of which is incorporated herein by reference. Two quality metrics that are particularly sensitive to coating uniformity variations leading to ink coalescence are "mottle" and "graininess." Each inkjet-printed image was analyzed using a PIAS-II device manufactured by Quality Engineering Associates. "Mottle" is the variance in density in an image region of interest and was measured using a 414-μm tile size. "Graininess" was measured using a 37-μm tile size. The mottle and graininess were measured for each of the ten steps in the inkjet printing and added together. These values, referred to as "SUM mottle" and "SUM graininess," respectively, are reported in TABLE IV below. Lower SUM mottle and low SUM graininess values are desired.

TABLE II

| | Mist Ranking | | | Defects Yes/No | | | SUM Mottle | | | SUM Graininess | | |
|---|---|---|---|---|---|---|---|---|---|---|---|---|
| | Wet Coverage | | | | | | | | | | | |
| Web Speed | 1 g/m$^2$ | 2.5 g/m$^2$ | 3.5 g/m$^2$ | 1 g/m$^2$ | 2.5 g/m$^2$ | 3.5 g/m$^2$ | 1 g/m$^2$ | 2.5 g/m$^2$ | 3.5 g/m$^2$ | 1 g/m$^2$ | 2.5 g/m$^2$ | 3.5 g/m$^2$ |
| 45 m/min | None | None | None | No | No | No | 11.4 | 8.1 | 8.0 | 47.8 | 42.5 | 41.8 |
| 90 m/min | very slight | very Slight | very slight | Yes | Yes | Yes | 9.1 | 6.8 | 7.4 | 44.7 | 39.4 | 40.7 |
| 150 m/min | High | High | High | Yes | Yes | Yes | 8.9 | 6.6 | 7.4 | 44.0 | 39.2 | 39.0 |

Example 2: Experiments to Reduce Mist

A series of Comparative aqueous ink receptive primer compositions were prepared according to the procedure described above with the variations of components indicated in the following TABLE III.

TABLE III

| Composition | P1 wt. % | S1 | W1 wt. % | $CaCl_2$ Salt | S2 | S3 | S4 | X1 | Viscosity (mPa-sec) | Surface Tension (dyne/cm) |
|---|---|---|---|---|---|---|---|---|---|---|
| Control Formulation | 3.5 | Yes | 0.7 | 8.0 | No | Yes | Yes | Yes | 26.7 | 28.9 |
| 2-2 | 2.5 | Yes | 0.0 | 5.6 | No | Yes | No | Yes | 9.6 | 29.3 |
| 2-3 | 2.5 | Yes | 0.5 | 5.6 | No | Yes | No | No | 10.0 | 29.1 |
| 2-4 | 2.5 | No | 0.5 | 5.6 | Yes | No | No | No | 9.6 | 32.8 |
| 2-5 | 2.5 | No | 0.5 | 5.6 | No | No | No | No | 9.7 | 31.3 |
| 2-6 | 2.5 | No | 0.5 | 5.6 | No | No | No | No | 9.7 | 29.2 |

Surfactants: S1 was CARBOWET® 106; S2 was TRITON™ CF-32; S3 was SURFYNOL® AD-01; S4 was SURFYNOL® DF-66; Wax particles W1 were provided by MICROSPERSION® 150-50; X1 refers to POLYCUP™ 9700; Polymers: P1 refers to the polymer obtained as Gohsenx Z-320.

Coatings of the Comparative aqueous ink receptive primer compositions were prepared on the water-absorptive substrate identified above using the forward roll coating apparatus running at the higher coating speeds of 300 and 500 feet/minute (90 and 150 m/min), respectively, and higher wet coating coverages of 2.5 and 3.5 g/m$^2$, where mist and mist-related coating defects were more prevalent according to Example 1. The following TABLE IV compares the measured inkjet-printed magenta image mottle of this series of coatings.

The results shown in TABLE IV show that the tested aqueous ink receptive primer compositions exhibited improved (or less) mist during coating relative to the Control aqueous ink receptive primer composition described above, but at the cost of inkjet-printed image quality. The increases in graininess and mottle indicate the improvement in mist comes with a penalty in diminished inkjet-printed image quality. As a result, none of these Comparative aqueous ink receptive primer compositions meets the need for low mist, high-speed printing, low coating defects, and acceptable inkjet-printed image quality.

Example 3: Polymers Used in Aqueous Ink Receptive Primer Compositions for Reduced Mist and Good Image Quality Another set of aqueous ink receptive primer compositions was prepared using different polymer, salt, wax particles, and defoamer combinations. The resulting formulations were applied to 60 #Sterling Ultra Gloss paper as a water-absorptive substrate using a reverse gravure laboratory coater (MiniLabo, Mirwec) with a speed ratio 1.8, a coating speed of 1 m/min, and a wet coating coverage of approximately 4.3 g/m$^2$. Inkjet-printed cyan images were formed as described above for Example 1 and the resulting inkjet-printed cyan pigment images were evaluated for cyan graininess and mottle. This was a more sensitive test for image quality, because cyan is typically the most sensitive color with respect to perceiving or seeing grain.

The various (b) water-soluble or water-dispersible polymeric binders used in these samples are described below in TABLE V and formulation amounts and results are shown below in TABLE VI ("I" refers to inventive compositions and "C" refers to comparative compositions). SELVOL™ 103 polyvinyl alcohol is a lower molecular weight poly (vinyl alcohol) that required significant changes in the formulations in order to achieve acceptable image quality. Lower amounts of wax particles (Sample 3-7), defoamer (Sample 3-2), and (a) water-soluble salt (Sample 3-6), standard amount of component (a) water-soluble salt (Sample 3-3) used in combination with this poly(vinyl alcohol) all resulted in higher graininess and mottle in the

TABLE IV

| | | Mist Ranking | | Defects Yes/No | | SUM Mottle | | SUM Graininess | |
|---|---|---|---|---|---|---|---|---|---|
| | | Wet Coverage | | | | | | | |
| Composition | Web speed | 2.5 g/m$^2$ | 3.5 g/m$^2$ | 2.5 g/m$^2$ | 3.5 g/m$^2$ | 2.5 g/m$^2$ | 3.5 g/m$^2$ | 2.5 g/m$^2$ | 3.5 g/m$^2$ |
| 2-2 | 90 m/min | None | None | No | No | 12.3 | 11.4 | 47.1 | 45.6 |
| 2-2 | 150 m/min | None | None | No | No | 9.9 | 9.6 | 43.3 | 43.3 |
| 2-3 | 90 m/min | Very slight | None | No | No | 12.9 | 14.5 | 48.2 | 50.6 |
| 2-3 | 150 m/min | Slight | Very slight | No | No | 11.5 | 13.5 | 46.5 | 49.0 |
| 2-4 | 90 m/min | None | Very slight | No | No | 11.9 | 12.8 | 48.2 | 47.6 |
| 2-4 | 150 m/min | Very slight | Very slight | No | No | 10.1 | 12.6 | 45.4 | 47.1 |
| 2-5 | 90 m/min | None | Very slight | No | No | 13.1 | 12 | 47.8 | 46.7 |
| 2-5 | 150 m/min | Slight | Slight | No | No | 9.7 | 10 | 45.7 | 46.4 |
| 2-6 | 90 m/min | Very slight | Very slight | No | No | 12.5 | 12.2 | 48.6 | 48.3 |
| 2-6 | 150 m/min | Slight | Slight | No | No | 10.1 | 10.4 | 46.2 | 45.7 |

inkjet-printed cyan images compared to the Control Samples 3-1 and 3-13. It was discovered that either higher levels of component (b) water-soluble or water-dispersible polymeric binder (Sample 3-4) or higher component (a) one or more water-soluble salts of a multivalent cation levels (Sample 3-5), were required to achieve acceptable low graininess and mottle in the inkjet-printed cyan pigment image. Aqueous ink receptive primer composition (Sample 3-9) containing SELVOL™ 325 exhibited even better graininess and mottle in the inkjet-printed cyan pigment image than Control Samples 3-1 and 3-13 without requiring increased amounts of salt or polymeric binder.

TABLE V

| | Degree of hydrolysis | Molecular weight ($M_w$) (approximate) |
|---|---|---|
| SELVOL ™ 103 | 98-98.8% | 25,000 |
| SELVOL ™ 310 | 98-98.8% | 50,000 |
| SELVOL ™ 325 | 98-98.8% | 120,000 |
| SELVOL ™ 540 | 87-89% | 120,000 |

TABLE VI

| Composition | Surfactant | Polymer | Wt. % Polymer | Salt Wt. % | Wax W1 Wt. % | Defoamer Wt. % | X1 | ST | Viscosity (mPa-sec) | SUM graininess | SUM mottle |
|---|---|---|---|---|---|---|---|---|---|---|---|
| 3-1 (Control) | S1 | P1 | 3.5 | 8 | 0.7 | 0.20 | No | 28.23 | 36.0 | 27.2 | 6.4 |
| 3-2 (C) | S2 | P2 | 3.5 | 8 | 0.7 | 0.05 | No | 30.60 | 11.0 | 36.0 | 7.9 |
| 3-3 (C) | S2 | P2 | 3.5 | 8 | 0.7 | 0 | No | 32.20 | 11.2 | 37.0 | 8.5 |
| 3-4 (C) | S2 | P2 | 7.0 | 8 | 0.7 | 0 | No | 32.25 | 21.6 | 29.6 | 7.1 |
| 3-4 (C) | S2 | P2 | 3.5 | 10 | 0.7 | 0 | No | 32.64 | 11.5 | 33.4 | 7.5 |
| 3-6 (C) | S2 | P2 | 3.5 | 6 | 0.7 | 0 | No | 31.31 | 11.2 | 39.5 | 9.3 |
| 3-7 (C) | S2 | P2 | 3.5 | 8 | 0.4 | 0 | No | 33.11 | 10.5 | 36.2 | 7.9 |
| 3-8 (I) | S2 | P3 | 3.5 | 8 | 0.7 | 0 | No | 31.79 | 17.4 | 28.4 | 6.6 |
| 3-9 (I) | S2 | P4 | 3.5 | 8 | 0.7 | 0 | No | 26.52 | 45.8 | 26.0 | 6.4 |
| 3-10 (I) | S2 | P5 | 3.5 | 8 | 0.7 | 0 | No | 32.25 | 47.1 | 28.4 | 6.2 |
| 3-11 (C) | S5 | P2 | 3.5 | 8 | 0.7 | 0 | No | 26.66 | 13.9 | 34.0 | 7.6 |
| 3-12 (C) | S5 | P2 | 3.5 | 8 | 0.7 | 0.10 | No | 27.04 | 11.7 | 36.9 | 8.3 |
| 3-13 (C) | S1 | P1 | 3.5 | 8 | 0.7 | 0.20 | Yes | 28.30 | 33.6 | 28.7 | 6.6 |

Surfactants, 0.15 wt. %: S1 was CARBOWET ® 106; S2 was TRITON ™ CF-32; S5 was TRITON ™ HW1000;

Polymers: P1 was Gohsenx Z-320 PV Aacac; P2 was SELVOL ™ 103; P3 was SELVOL ™ 310; P4 was SELVOL ™ 325; P5 was SELVOL ™ 540; X1 was POLYCUP ™ 9700 crosslinking agent.

Wax W1 was Microspersion 150-50; ST = surface tension, dyne/cm.

Example 4: Evaluations of Aqueous Ink Receptive Primer Compositions

A set of aqueous ink receptive primer compositions were formulated (see TABLE VII below) and selected for further evaluation using forward roll coating equipment to apply coatings at high speed, as described in Example 1. The compositions are identified as comparative (C) or inventive (I). Mist, coating defects, and image quality were evaluated for each disposed aqueous ink receptive primer composition after inkjet printing a cyan pigment image of an aqueous cyan pigment-based inkjet ink on the resulting inkjet receiving media. Sample 4-7 performed best with the best overall image quality, no coating defects, and a significant improvement with lower mist compared to the Control aqueous ink receptive primer composition described above. The results are shown below in TABLE VIII ("C" for comparative and "I" for inventive).

TABLE VII

| Composition | Polymer | Polymer Level (Wt. %) | Surfactant | Surfactant Level (Wt. %) | Salt Wt. % | Add B/C | Add B/C % | Wax W1 Weight % |
|---|---|---|---|---|---|---|---|---|
| 4-1 (C) | P1 | 3.5 | S1 | 0.150 | 8 | S4/S1 | 0.1/0.1 | 0.7 |
| 4-2 (C) | P1 | 3.5 | S1 | 0.150 | 8 Mg | S5 | 0.2 | 0.3 |
| 4-3 (C) | P2 | 7.0 | S2 | 0.150 | 8 | S5 | 0.050 | 0.5 |
| 4-4 (C) | P2 | 3.5 | S2 | 0.150 | 10 | S5 | 0.050 | 0.5 |
| 4-5 (C) | P1 | 3.5 | S2 | 0.150 | 8 Mg | — | 0 | 0.3 |
| 4-6 (C) | P1 | 2.5 | S1 | 0.150 | 8 | S1 | 0.1 | 0.0 |
| 4-7 (I) | P4 | 3.5 | S2 | 0.150 | 8 | — | 0 | 0.4 |
| 4-8 (C) | P1 & 1.5% P5 | 3.5 | S2 | 0.150 | 8 | — | 0 | 0.4 |

TABLE VII-continued

| Composition | Polymer | Polymer Level (Wt. %) | Surfactant | Surfactant Level (Wt. %) | Salt Wt. % | Add B/C | Add B/C % | Wax W1 Weight % |
|---|---|---|---|---|---|---|---|---|
| 4-9 (C) | P1 | 3.2 | S1 | 0.14 | 7.3 | S4/S1 | 0.09/0.09 | 0.65 |
| 4-10 (C) | P1 | 2.9 | S1 | 0.13 | 6.7 | S4/S1 | 0.085/0.085 | 0.6 |
| 4-11 (C) | P1 | 2.7 | S1 | 0.11 | 6.2 | S4/S1 | 0.08/0.08 | 0.55 |

Polymers: P1 was Gohsenz Z-320 PV Aacac; P2 was SELVOL ™ 103; P4 was SELVOL ™ 325; P5 was Polyvinyl amine (Xelorex);
Surfactants, 0.15 weight %; S1 was CARBOWET ® 106; S2 was TRITON ™ CF-32; S3 was SURFYNOL ® AD-01; S4 was URFYNOL ® DF-66; S5 was SURFYNOL ® SE-F;
Mg was good grade magnesium chloride hexahydrate;
Wax: W1 was Microspersion 150-50

TABLE VIII

| Sample | Web speed (m/min) | Defects 2.5 g/m$^2$ | Defects 3.5 g/m$^2$ | Mist Evaluation** 2.5 g/m$^2$ | Mist Evaluation** 3.5 g/m$^2$ | SUM graininess 2.5 g/m$^2$ | SUM graininess 3.5 g/m$^2$ | SUM Mottle 2.5 g/m$^2$ | SUM Mottle 3.5 g/m$^2$ |
|---|---|---|---|---|---|---|---|---|---|
| Control Formulation Example 1 | 90 | 3 | 3 | 0 | 2 | 36.3 | 35.55 | 8.8 | 8.65 |
| | 150 | 3 | 3 | 3 | 4 | 34.6 | 34.75 | 8.8 | 8.35 |
| 4-1 (C) | 90 | 3 | 3 | 1 | 2 | 36.2 | 34 | 8.75 | 9.2 |
| | 150 | 3 | 3 | 2 | 3 | 35.15 | 34.1 | 8.65 | 9.1 |
| 4-2 (C) | 90 | 0 | 0 | 1 | 1 | 36.8 | 33.9 | 10.55 | 8.4 |
| | 150 | 0 | 0 | 4 | 4 | 35.45 | 33.7 | 10.35 | 8.5 |
| 4-3 (C) | 90 | 3 | 3 | 0 | 1 | 34.75 | 33.6 | 8.45 | 8.2 |
| | 150 | 3 | 3 | 0 | 0 | 37.5 | 36.5 | 8.95 | 8.55 |
| 4-4 (C) | 90 | 3 | 3 | 0 | 0 | 38.45 | 38.2 | 8.9 | 8.7 |
| | 150 | 3 | 3 | 0 | 0 | 36.8 | 36.6 | 8.8 | 8.95 |
| 4-5 (C) | 90 | 2 | 3 | 1 | 0 | 34.1 | 34.1 | 8.2 | 8.0 |
| | 150 | 3 | 3 | 3 | 3 | 33.9 | 33.8 | 7.7 | 7.7 |
| 4-6 (C) | 90 | 0 | 0 | 0 | 1 | 36.1 | 36.1 | 8.6 | 8.6 |
| | 150 | 0 | 0 | 2 | 0 | 35.0 | 35.0 | 8.3 | 8.4 |
| 4-7 (1) | 90 | 0 | 0 | 1 | 1 | 32.5 | 32.8 | 8.4 | 8.0 |
| | 150 | 0 | 0 | 3 | 3 | 32.4 | 32.0 | 8.2 | 8.3 |
| 4-8 (C) | 90 | 0 | 0 | 0 | 0 | 37.6 | 35.9 | 8.6 | 8.6 |
| | 150 | 2 | 2 | 0 | 0 | 36.2 | 34.6 | 8.2 | 8.7 |
| 4-9 (C) | 90 | NR* | 0 | NR* | 2 | NR* | 34.5 | NR* | 8.3 |
| | 150 | NR* | 3 | NR* | 3 | NR* | 34.1 | NR* | 8.5 |
| 4-10 (C) | 90 | NR* | 1 | NR* | 2 | NR* | 35.4 | NR* | 8.6 |
| | 150 | NR* | 3 | NR* | 3 | NR* | 34.2 | NR* | 8.7 |
| 4-11 (C) | 90 | NR* | 0 | NR* | 3 | NR* | 35.1 | NR* | 8.6 |
| | 150 | NR* | 0 | NR* | 1 | NR* | 34.7 | NR* | 8.2 |

*NR: did not run (or carry out)
**mist rankings: 0-none, 1-very slight, 2-slight, 3-moderate, 4-high

Example 5: Use of Component (c) Fluorine-free Wax Particles and Effect on Mist and Coating Defects Component (c) fluorine-free wax dispersions were obtained from Micro Powders, Inc. and were tested for basic compatibility with the other desired components of the aqueous ink receptive primer compositions shown below in TABLE IX. Properties of these fluorine-free wax particle dispersions are summarized below in TABLE X. All component (c) fluorine-free wax particles evaluated herein comprise a polyalkylene. Specifically, polyethylene is in the component (c) fluorine-free wax particles of the commercial product MICROSPERSION® 611AL-50. MICROSPERSION® 1226XF-50 and 6515AL-40 comprise component (c) fluorine-free wax particles comprising high-density polypropylene. Compatibility testing consisted of evaluating the melt (or dispersion) stability, inspecting the compositions for particles and agglomerates, monitoring phase separation over time, and evaluating dispersibility of the components after phase separation. The dispersed component (c) fluorine-free waxes in the aqueous ink receptive primer compositions were not neutrally buoyant in the formulations and floated over time. The aqueous ink receptive primer compositions were allowed to phase separate into a floating fluorine-free wax particle layer, and the dispersibility of that floating fluorine-free wax particle layer into the rest of the aqueous ink receptive primer composition was evaluated. The result of this test is referred to herein as "wax dispersibility." Coatings of selected aqueous ink receptive primer compositions were prepared and printed as described above in Example 1. Print quality (graininess and mottle) was evaluated using the same procedures previously described. A separate set of color aqueous pigment-based images were inkjet-printed as described in Example 1 to evaluate dry rub resistance. Six test patches used for rub resistance evaluations included an aqueous black pigment-based ink printed at 100% of maximum ink coverage over images obtained from aqueous yellow-, cyan-, and magenta-based pigment inks (primary colors) as well as over images obtained from aqueous red-, green-, and blue-pigment based inks (secondary colors). Each of the underlying printed color images were printed at 100% of maximum ink coverage. Each of the test patches was rubbed with a 2"×4" (5 cm×10 cm) piece of bond paper beneath a 4-$lb_m$ (1.82 kg) weight for 10 back and forth cycles using a Sutherland rub tester. Dry rub resistance was characterized by measuring the % density change in each of the abraded patches. For example, a rub resistance test can be carried out as described in U.S. Pat. No. 9,067,448B2 (Col. 15, lines 30-37), the disclosure of which is incorporated herein by reference.

Pass or fail was determined by comparing the performance to the images formed over a disposed aqueous ink receptive primer composition formulation containing MICROSPERSION® 150-50 fluorine-free wax particles.

The component (c) fluorine-free wax particle products that exhibited the more desirable results, which is as acceptable as those used in the Control aqueous ink receptive primer composition described above (containing MICROSPERSION® 150-50 wax particles), were MICROSPERSION® 611AL-50 and MICROSPERSION® 611-50. The other tested component (c) fluorine-free wax particles exhibited less desirable compatibility with the other components of the aqueous ink receptive primer compositions, but they may be useful in other formulated aqueous ink receptive primer compositions that can be formulated using routine experimentation. The use of MICROSPERSION® 611AL-50 fluorine-free wax particles also exhibited the added benefit of good dispersibility after phase separation. The results are shown below in TABLE XI (comparative experiments are identified with "C" and inventive experiments are identified as "I").

TABLE IX

Aqueous Ink Receptive Primer Compositions for Wax Compatibility Testing

| Component | Weight % |
|---|---|
| Poly(vinyl alcohol) SELVOL ™ 325 | 3.2% |
| Calcium chloride, anhydrous | 8% |
| Wax Particles (see TABLE X) | 0.2-0.4% |
| TRITON ™ CF-32 | 0.15 |
| Other addenda* | 0.22% |
| Deionized water | Balance of 100% |

TABLE X

| Wax Particles | Fluorine-free? | Density g/cm$^3$ | Viscosity (mPa-sec) | pH | Wax Particle Size (μm) |
|---|---|---|---|---|---|
| MICROSPERSION ® 150-50 | No | 1.05 | 3,000-5,000 | 8.0-10.0 | 3.5-5.5 |
| MICROSPERSION ® 6515AL-40 | Yes | 0.99 | 500-4,000 | 6.0-8.0 | 3.5-5.5 |
| MICROSPERSION ® 611-50 | Yes | 0.96 | 2,500-4,500 | 9.0-10.5 | 5.0-8.0 |
| MICROSPERSION ® 611AL-50 | Yes | 0.99 | 3,000-8,000 | 9.0-10.5 | 3.5-5.5 |
| MICROSPERSION ® 1226XF-50 | Yes | 0.99 | 2,000-9,000 | 6.0-8.0 | 3.5-5.5 |
| MICROSPERSION ® 526E | Yes | 0.96 | <50 | 9.5-10.5 | |
| MICROSPERSION ® 504E | Yes | 0.96 | <500 | 7.5-9.5 | Smaller |

TABLE XI

| Wax Particles | Fluorine-free? | Compatibility | Dispersibility | Rub Resistance | SUM Graininess | SUM Mottle |
|---|---|---|---|---|---|---|
| MICROSPERSION ® 150-50 (C) | No | Good | Good | Pass | 33.5 | 7.0 |
| No Wax Particles (C) | Not pertinent | Good | Good | Fail | 34.2 | 7.6 |
| MICROSPERSION ® 6515AL-40 (C) | Yes | Poor | — | — | 34.0 | 7.3 |
| MICROSPERSION ® 611-50 (I) | Yes | Good | Moderate | Pass | 33.7 | 7.4 |
| MICROSPERSION ® 611AL-50 (I) | Yes | Good | Good | Pass | 33.7 | 7.1 |
| MICROSPERSION ® 1226XF-50 (C) | Yes | Poor | — | Pass | 33.8 | 7.5 |
| MICROSPERSION ® 526E (C) | Yes | Poor | — | — | — | — |
| MICROSPERSION ® 504E (C) | Yes | Poor | — | — | — | — |

Example 6: Use of Colloidal Silica to Improve Floatation of Component (c) Fluorine-free Wax Particles Phase separation of components of aqueous ink receptive primer compositions can present an inconvenience in handling those compositions in an inkjet printing press environment and use. While periodic mixing of aqueous ink receptive primer compositions is a generally accepted operation to minimize phase separation, too rapid phase separation can lead to a greater chance of dispensing components therein during use in undesirable ratios, resulting in coating non-uniformities and image defects. Another consequence of too rapid phase separation is the possibility of components in the aqueous ink receptive primer composition rising to the surface in the coating pan during idle time and drying onto the rolls at the air-liquid interface. Residue can also accumulate on the vessel walls, requiring additional mixing time to redisperse all of the components.

A surprising solution to this problem and particularly to the problem of flotation of component (c) fluorine-free wax particles (and perhaps also for fluorine-containing wax particles for other uses than the present invention) was surprisingly found to be adding alumina-coated silica (for example, alumina-coated colloidal silica particles available as LUDOX® CL) to the aqueous ink receptive primer composition. This material is a positively-charged colloidal silica in which each silica particle is coated with a layer of alumina with a stabilizing chloride counter-ion. The addition of this alumina-stabilized colloidal silica dispersion resulted in significantly slowing the flotation rate of component (c) fluorine-free wax particles and its presence led to slow settling of the particles over time. All levels of colloidal silica addition improved the dispersibility of the phase-separated components, including the component (c) fluorine-free wax particles even after several weeks of non-mixing. This result occurred, it is believed because as there was less compaction of the phase-separated components when the colloidal silica was present; it was easier to mix the aqueous ink receptive primer composition from the bottom of the vessel; and there was no residue of materials accumulated on the vessel walls.

The colloidal silica materials used and the results in the aqueous ink receptive primer composition are described below in TABLE XII (comparative samples are identified with "C" and inventive samples are identified with "I").

TABLE XII

| Sample | Wt. % MICROSPERSION® 611AL-50 | Wt. % Colloidal Silica | Settling Distance after 6 hours | Dispersibility | Residue on Mixing Vessel Walls? |
|---|---|---|---|---|---|
| 6-1 (C) | 0.7 | 0 | −7 mm (floating) | Good | Yes |
| 6-2 (I) | 0.7 | 0.4 | 6 mm | Very good | No |
| 6-3 (I) | 0.7 | 0.6 | 10 mm | Very good | No |
| 6-4 (I) | 0.7 | 0.8 | 15 mm | Very good | No |
| 6-5 (I) | 0.7 | 0.076 | −1 mm/ 3 sink Neutrally buoyant | Outstanding | No |
| 6-6 (I) | 0.7 | 0.095 | Neutrally buoyant | No phase separation | No |

By way of comparison, the following TABLE XIII shows results of mixing a dispersion containing only the alumina-coated colloidal silica and the component (c) fluorine-free wax particles dispersion, outside of an aqueous ink receptive primer composition. A 30 weight % alumina-coated silica dispersion was added to the 50 weight % MICROSPERSION® 611AL-50 component (c) fluorine-free wax particles in the weight ratios indicated. Combining these materials destabilized the component (c) fluorine-free wax particles and large agglomerates or a solid mass were formed.

TABLE XIII

| Sample | Wt. % Fluorine-free Wax Particles MICROSPERSION® 611-AL50 | Wt. % Colloidal Silica | Colloidal Silica: Fluorine-free Wax (w/w) | Addition Order | Results |
|---|---|---|---|---|---|
| 6-7 (C) | 41 | 5.4 | 0.13 | Silica to wax | Incompatible - solid mass |
| 6-8 (C) | 20.7 | 17.6 | 0.85 | Silica to wax | Incompatible - large particles |
| 6-9 (C) | 20.7 | 17.6 | 0.85 | Wax to silica | Incompatible - large particles |

Example 7: Press Trials and Evaluation of Misting and Coating Defects & Relative Flotation Rate of Wax Particles A set of aqueous ink receptive primer compositions were formulated and selected for further evaluation using forward-roll coating equipment to apply coatings at high speed, as described above. The aqueous ink receptive primer compositions are reported in TABLE XIV below. Mist levels, coating defects, and image quality were evaluated for each coated aqueous ink receptive primer composition after inkjet printing an aqueous cyan image using an aqueous cyan pigment-based inkjet ink on the resulting inkjet receiving media. Results of these evaluations are shown below in TABLES XV and XVI (comparative test are identified with "C" and inventive tests are identified with "I"). These results show that inkjet-printed images prepared on the Inventive aqueous ink receptive primer compositions containing SELVOL™ 325 and component (c) fluorine-free waxes exhibited good image quality, as indicated by low graininess and mottle, and no print defects arising from mist, compared to the adverse mist and image defects observed when Comparative aqueous topcoat compositions containing Z-320 were coated at high speed of 150 m/min onto a water-absorptive substrate followed by inkjet printing of the cyan pigment-based ink. Aqueous ink receptive primer compositions, Samples 7-4 and 7-5 both performed very well at high-speed using a forward roll-coating applicator and no mist was observed at 120 m/min. Aqueous ink receptive primer composition, Sample 7-5 had the added benefit of exhibiting reduced buoyancy of the component (c) fluorine-free wax particles. This aqueous ink receptive primer composition did not phase separate into a floating wax cake during the formulating procedure, thereby simplifying its handling in an inkjet printing press environment.

TABLE XIV

| Component | Composition 7-1 | 7-2 | 7-3 | 7-4 | 7-5 |
|---|---|---|---|---|---|
| Z-320 PVA | 0 | 0 | 2.8% | 0 | 0 |
| Poly(vinyl alcohol) SELVOLTM 325 | 3.2% | 3.2% | 0 | 3.2 | 3.2 |
| CaC12, anhydrous | 8% | 8% | 8% | 8 | 8 |
| MICROSPERSION ® 611-50 | 0.4% | 0 | 0 | 0 | 0 |
| MICROSPERSION 611AL-50 | 0 | 0.4% | 0 | 0.4% | 0.4% |
| MICROSPERSION ® 150-50 | 0 | 0 | 0.5% | 0 | 0 |
| CARBOWET ® 106 | 0 | 0 | 0.12% | 0 | 0 |
| SURFYNOL ® SE-F | 0 | 0 | 0.15% | 0.1% | 0.1% |
| LUDOX CL | 0 | 0 | 0 | 0 | 0.8% |
| TRITON ™ CF-32 | 0.15 | 0.15% | 0% | 0% | 0% |
| Other addenda* | 0.2% | 0.2% | 0.2% | 0.2% | 0.2% |
| Deionized water | Balance of 100% | Balance of 100% | Balance of 100% | Balance of 100% | Balance of 100% |

TABLE XV

| Test # | Coating Speed (m/min) | Aqueous Ink Receptive Primer Composition | Wet coating g/m$^2$ | Mist Evaluation | Defects | SUM Graininess | SUM Mottle |
|---|---|---|---|---|---|---|---|
| 1 (I) | 100 | 7-1 | 3.4 | Very slight | No | 31.8 | 7.5 |
| 2 (I) | 150 | 7-1 | 3.65 | Moderate | No | 32.6 | 7.3 |
| 3 (I) | 100 | 7-2 | 2.9 | Slight | No | 33.9 | 7.9 |
| 4 (I) | 150 | 7-2 | 3.4 | Moderate | No | 32.8 | 7.1 |
| 5 (C) | 100 | 7-3 | 3.2 | Very slight | No | 33.8 | 7.5 |
| 6 (C) | 100 | 7-3 | 2.6 | Very slight | No | 34 | 7.2 |
| 7 (C) | 150 | 7-3 | 3 | Moderate | Yes | 33.7 | 7.4 |

TABLE XVI

| Test # | Coating Speed (m/min) | Aqueous Ink Receptive Primer Composition | Mist Evaluation | Wax Flotation |
|---|---|---|---|---|
| 1 (C) | 90 | 7-3 | Very slight | Yes |
| 2 (C) | 150 | 7-3 | Slight | Yes |
| 3 (I) | 120 | 7-4 | None | Yes |
| 4 (I) | 120 | 7-5 | None | No |

Example 8: Evaluations of Aqueous Ink Receptive Primer Compositions

A set of aqueous ink receptive primer compositions were formulated (see TABLE XVII below) and selected for further evaluation using forward roll coating equipment to apply coatings at high speed, as described above. Mist and coating defects were evaluated for each disposed aqueous ink receptive primer composition after inkjet printing a cyan pigment image of an aqueous cyan pigment-based inkjet ink on the resulting inkjet receiving media. Sample 8-5 performed best with no coating defects, and a significant improvement with lower mist compared to the Control aqueous ink receptive primer composition described above. The results are shown below in TABLE XVIII.

TABLE XVII

| Composition | Polymer | Polymer Level (Wt. %) | Surfactant | Surfactant Level (Wt. %) | Salt Wt. % | Additional Surfactants B/C | Additional Surfactants B/C % | Wax W1 Weight % |
|---|---|---|---|---|---|---|---|---|
| 8-1 | P1 | 2.8 | S1 | 0.12 | 6.4 | S3/S4 | 0.08/0.08 | 0.58 |
| 8-2 | P1 | 2.7 | S1 | 0.12 | 6.2 | S3/S4 | 0.08/0.08 | 0.56 |
| 8-3 | P1 | 2.7 | S1 | 0.12 | 7.1 | S3/S4 | 0.08/0.08 | 0.56 |
| 8-4 | P1 | 2.7 | S1 | 0.12 | 8 | S3/S4 | 0.08/0.08 | 0.56 |
| 8-5 | P4 | 3.5 | S2 | 0.150 | 8 | — | 0 | 0.4 |

Polymers: P1 was Gohsenx Z-320 PV Aacac; P4 was SELVOL ™ 325;
Surfactants: S1 was CARBOWET ® 106; S2 was TRITION ™ CF-32; S3 was SURFYNOL ® AD-01; S4 was SURFYNOL ® DF-66; S5 was SURFYNOL SE-F;
Was: W1 was MICROSPERSION ® 150-50;
Mg was food grade magnesium chloride hexahydrate.

TABLE XVII

| Sample | Web speed (m/min) | Defects 2.5 $g/m^2$ | Defects 3.5 $g/m^2$ | Mist Evaluation** 2.5 $g/m^2$ | Mist Evaluation** 3.5 $g/m^2$ |
|---|---|---|---|---|---|
| 8-1 | 90 | NR | Y | NR | Mod |
| | 150 | NR | Y | NR | High |
| 8-2 | 90 | NR | N | NR | Low |
| | 150 | NR | Y | NR | Mod |
| 8-3 | 90 | Y | Y | NR | NR |
| 8-4 | 90 | N | — | Mod | Low |
| 8-5 | 90 | N | N | Low | Low |
| | 150 | N | N | NR | Mod |

*NR: did not carry out a test for this sample

The invention has been described in detail with particular reference to certain preferred embodiments thereof, but it will be understood that variations and modifications can be achieved within the spirit and scope of the invention.

PARTS LIST

10 inkjet receiving medium
20 inkjet recording medium
100 absorptive substrate
110 disposed aqueous ink receptive primer composition
120 inkjet-printed image

The invention claimed is:

1. An aqueous ink receptive primer composition for pre-treating a water-absorptive substrate prior to inkjet printing thereon, the aqueous ink receptive primer composition having at least 8% solids and up to and including 25% solids, and comprising at least the following components (a), (b), and (c):

(a) one or more water-soluble salts of a multivalent metal cation, which (a) one or more water-soluble salts are present in a total amount of at least 0.1 weight % and up to and including 30 weight %;

(b) one or more water-soluble or water-dispersible polymeric binder materials that are present in a total amount of at least 1 weight % and up to and including 20 weight %, each of which (b) one or more water-soluble or water-dispersible polymeric binder materials has a weight average molecular weight ($M_w$) of at least 50,000 and up to and including 180,000;

(c) fluorine-free wax particles composed of a water-insoluble composite comprising a polymer selected from a polyalkylene, a polyester, or a polyimide, which polymer is homogeneously combined in the water-insoluble composite with an inorganic material selected from an oxide, a carbide, a carbonate, and a phosphate, which inorganic material has a mean particle size below 1000 nm, and which (c) fluorine-free wax particles are present in an amount of at least 0.1 weight % and up to and including 2 weight %, wherein the amounts of the components (a), (b), and (c) are based on the total weight of the aqueous ink receptive primer composition.

2. The aqueous ink receptive composition of claim 1, wherein the component (c) fluorine-free wax particles are composed of a water-insoluble composite comprising a polyalkylene that is homogenously combined with aluminum oxide, which (c) fluorine-free wax particles are present in an amount of at least 0.4 weight % and up to and including 1.2 weight %, based on the total weight of the aqueous ink receptive primer composition.

3. The aqueous ink receptive primer composition of claim 1, further comprising silica particles.

4. The aqueous ink receptive primer composition of claim 3, wherein the silica particles are colloidal silica particles, and are present in an amount of at least 0.3 weight % and up to and including 1.8 weight %, based on the total weight of the aqueous ink receptive primer composition.

5. The aqueous ink receptive primer composition of claim 4, wherein the colloidal silica particles are aluminum-stabilized colloidal silica particles.

6. The aqueous ink receptive primer composition of claim 1, wherein the component (b) one or more water-soluble or water-dispersible polymeric binder materials comprise one or more of a polyvinyl alcohol, an acetate derivative of polyvinyl alcohol, a copolymer derived at least in part from vinyl alcohol and ethylene oxide, or a combination of two or more of these polymeric materials.

7. The aqueous ink receptive primer composition of claim 1, wherein component (b) one or more water-soluble or water-dispersible polymeric binder materials are present in a total amount of at least 2 weight % and up to and including 10 weight %, based on the total weight of the aqueous ink receptive primer composition.

8. The aqueous ink receptive primer composition of claim 1, wherein each of the component (b) one or more water-soluble or water-dispersible polymeric binder materials has a weight average molecular weight ($M_w$) of at least 80,000 and up to and including 150,000.

9. The aqueous ink receptive primer composition of claim 1, wherein the component (c) fluorine-free wax particles are present in an amount of at least 0.4 weight % and up to and including 1.2 weight %, based on the total weight of the aqueous ink receptive primer composition.

10. An inkjet receiving medium comprising a water-absorptive substrate and an aqueous ink receptive primer composition disposed on a surface thereof, which disposed aqueous ink receptive primer composition comprises the following components (a), (b), and (c):

(a) one or more water-soluble salts of a multivalent metal cation, which component (a) one or more water-soluble salts are present in a total amount of at least 20 weight % and up to and including 80 weight %;

(b) one or more water-soluble or water-dispersible polymeric binder materials that are present in a total amount of at least 10 weight % and up to and including 40 weight %, each of which component (b) one or more water-soluble or water-dispersible polymeric binder materials has a weight average molecular weight ($M_w$) of at least 50,000 and up to and including 180,000; and (c) fluorine-free wax particles composed of a water-insoluble composite comprising a polymer selected from a polyalkylene, a polyester, or a polyimide, which polymer is homogeneously combined in the water-insoluble composite with an inorganic material selected from an oxide, a carbide, a carbonate, and a phosphate, which inorganic material has a mean particle size below 1000 nm, and which (c) fluorine-free wax particles are present in an amount of at least 2.5 weight % and up to and including 12 weight %, and wherein the amounts of the components (a), (b), and (c) are based on the total weight of the disposed aqueous ink receptive primer composition.

11. The inkjet receiving medium of claim 10, wherein the disposed aqueous ink receptive primer composition has a dry solids coating weight of at least 0.2 g/m$^2$ and up to and including 2 g/m$^2$.

12. The inkjet receiving medium of claim 10, wherein the component (c) fluorine-free wax particles are composed of a water-insoluble composite comprising a polyalkylene that is homogenously combined with aluminum oxide, which (c) fluorine-free wax particles are present in an amount of at least 2.5 weight % and up to and including 8 weight %, based on the total weight of the disposed aqueous ink receptive primer composition.

13. The inkjet receiving medium of claim 10, wherein the disposed aqueous ink receptive primer composition further comprises silica particles.

14. The inkjet receiving medium of claim 13, wherein the silica particles are aluminum-stabilized colloidal silica particles.

15. The inkjet receiving medium of claim 10, wherein the component (c) fluorine-free wax particles are composed of a composite of polyethylene that is homogenously combined with an oxide, which (c) fluorine-free wax particles and are present in an amount of at least 2.5 weight % and up to and including 8 weight %, based on the total weight of the disposed aqueous ink receptive primer composition.

16. The inkjet receiving medium of claim 10, wherein the water-absorptive substrate comprises one or more cellulosic materials in one or multiple layers.

17. A method for providing an inkjet receiving medium comprising, in order the following Steps A and B:

A) providing a water-absorptive substrate; and

B) disposing an aqueous ink receptive primer composition onto at least one surface of the water-absorptive substrate, to provide an inkjet receiving medium having a disposed aqueous ink receptive primer composition on the at least one water-absorptive substrate surface, the disposed aqueous ink receptive primer composition comprising the following components (a), (b), and (c):

(a) one or more water-soluble salts of a multivalent metal cation, which component (a) one or more water-soluble salts are present in a total amount of at least 20 weight % and up to and including 80 weight %;

(b) one or more water-soluble or water-dispersible polymeric binder materials that are present in a total amount of at least 10 weight % and up to and including 40 weight %, each of which component (b) one or more water-soluble or water-dispersible polymeric binder materials has a weight average molecular weight ($M_w$) of at least 50,000 and up to and including 180,000; and (c) fluorine-free wax particles composed of a water-insoluble composite comprising a polymer selected from a polyalkylene, a polyester, or a polyimide, which polymer is homogeneously combined in the water-insoluble composite with an inorganic material selected from an oxide, a carbide, a carbonate, and a phosphate, which inorganic material has a mean particle size below 1000 nm, and which (c) fluorine-free wax particles are present in an amount of at least 2.5 weight % and up to and including 12 weight %, and wherein the amounts of the components (a), (b), and (c) are based on the total weight of the disposed aqueous ink receptive primer composition.

18. The method of claim 17, wherein step B) is carried out using forward roll coating or flexographic printing.

19. The method of claim 17, wherein step B) is carried out subsequently to preparing the water-absorptive substrate in an in-line process.

20. The method of claim 17, wherein the disposed aqueous ink receptive primer composition further comprises silica particles.

21. The method of claim 20, wherein the silica particles are colloidal silica particles, and are present in an amount of at least 0.3 weight % and up to and including 1.8 weight %, based on the total weight of the aqueous ink receptive primer composition.

22. The method of claim 17, wherein the component (b) one or more water-soluble or water-dispersible polymeric binder materials are present in the disposed aqueous ink receptive primer composition in a total amount of at least 15 weight % and up to and including 35 weight %, based on the total weight of the disposed aqueous ink receptive primer composition.

23. The method of claim 17, wherein each of the component (b) one or more water-soluble or water-dispersible polymeric binder materials has a weight average molecular weight ($M_w$) of at least 80,000 and up to and including 150,000.

24. The method of claim 17, wherein the component (c) fluorine-free wax particles are present in the disposed aqueous ink receptive primer composition in an amount of at least 2.5 weight % and up to and including 8 weight %, based on the total weight of the disposed aqueous ink receptive primer composition.

25. The method of claim 17, wherein the water-absorptive substrate is a glossy, semi-glossy, or matte-coated lithographic offset paper.

* * * * *